United States Patent
Park

(10) Patent No.: US 7,023,773 B2
(45) Date of Patent: Apr. 4, 2006

(54) APPARATUS AND METHOD OF GENERATING OPTIMUM RECORDING POWER FOR OPTICAL RECORDING/REPRODUCING APPARATUS

(75) Inventor: Sang On Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 552 days.

(21) Appl. No.: 09/991,252

(22) Filed: Nov. 16, 2001

(65) Prior Publication Data

US 2002/0098806 A1 Jul. 25, 2002

(30) Foreign Application Priority Data

Nov. 17, 2000 (KR) .............................. 2000-68452
Nov. 28, 2000 (KR) .............................. 2000-71326

(51) Int. Cl.
*G11B 7/00* (2006.01)

(52) U.S. Cl. .............................. 369/47.53; 369/44.26; 369/59.25

(58) Field of Classification Search ............. 369/44.26, 369/47.5, 47.53, 59.25, 116, 275.3, 275.4
See application file for complete search history.

(56) References Cited

U.S. PATENT DOCUMENTS

| | | | | |
|---|---|---|---|---|
| 5,737,289 A | * | 4/1998 | Udagawa ..................... 369/116 |
| 5,848,045 A | * | 12/1998 | Kirino et al. ............ 369/47.53 |
| 6,765,851 B1 | * | 7/2004 | Kawashima et al. ..... 369/47.53 |

* cited by examiner

*Primary Examiner*—William Korzuch
*Assistant Examiner*—Van Pham
(74) *Attorney, Agent, or Firm*—Lee, Hong, Degerman, Kang & Schmadeka

(57) ABSTRACT

A method and apparatus for generating an optimum recording power before recording user data in a recordable optical recording medium is disclosed. According to the method and apparatus, an optimum power calibration (OPC) is performed in the unit of a sector, and the start position of the respective physical sector can be synchronized. Thus, the optimum recording power can be determined even in a DVD-R/RW in which a PCA area exists but no OPC method is prescribed. Also, the degree of OPC can be heightened, and the limitation of the PCA area can be overcome. The method and apparatus also enables an easy and accurate search of the start position even in an odd sector where LPP data is recorded in odd positions.

26 Claims, 31 Drawing Sheets

$$\beta = \frac{|A_1| - |A_2|}{|A_1| + |A_2|}$$

$$m = \frac{|Top| - |Bottom|}{|Top|}$$

$$\gamma = \frac{dm}{dP} \frac{P}{m}$$

Po=Pt*ρ: Optimum Recording Power $$\text{Beta} = \{(A1-Vref)-(Vref-A2)\}/(A1-A2)$$
$$= (A1+A2-2Vref)/(A1-A2)$$

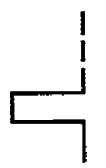
FIG. 12B
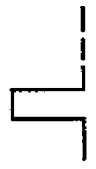
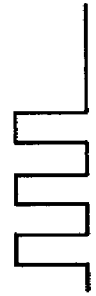

$$\sigma = \frac{\sqrt{\Sigma(3T-(3T+\Delta T))^2}}{N} \qquad Jitter(\%) = \frac{\sigma}{T} \times 100$$

jitter detection section jitter detection section

APPARATUS AND METHOD OF GENERATING OPTIMUM RECORDING POWER FOR OPTICAL RECORDING/REPRODUCING APPARATUS

BACKGROUND OF THE INVENTION

1. Field of the Invention

The present invention relates to a system for recording/reproducing data on an optical disc, and more particularly, to an apparatus and method of generating an optimum recording power for recording the data on the disc.

2. Background of the Related Art

As the storage capacity of the existing CD-ROM title is gradually reaching the uppermost limit, a digital versatile disc (DVD) is spotlighted as a new storage medium. This DVD is not so different from a compact disc (CD) in implementation principle. That is, the DVD recognizes data on the same principle as the CD that recognizes data of 0 and 1 by the difference of reflected light quantity using a laser. However, the width of data storage of the DVD is minute in comparison to the CD.

The CD or DVD is briefly classified into three types according to its function and purpose: a read only memory (ROM) type, write one read many (WORM) type on which data can be written only once, and rewritable type on which data can be repeatedly written.

Here, as the ROM type optical disc, there exist a compact disc read only memory (CD-ROM), a digital versatile disc read only memory (DVD-ROM), etc. As the WORM type optical recording medium, there exist a recordable compact disc (CD-R) on which data can be written only once, a recordable digital versatile disc (DVD-R) on which data can be written only once, etc. Also, as the rewritable optical disc, there exist a rewritable compact disc (CD-RW), a rewritable digital versatile disc (DVD-RW, DVD-RAM, and DVD+RW), etc.

The apparatus for recording/reproducing the optical disc of the CD series or of the DVD series records information on the optical disc by irradiating onto the optical disc an optical beam of a relatively large energy that can change the physical characteristic of an information recording layer, and reproduces the information from the optical disc by using the optical beam of a small energy that cannot change the physical characteristic of the information recording layer. In other words, during the recording operation, the optical disc recording/reproducing apparatus records the information by forming pits on the disc by driving a laser diode (LD) with a relatively high recording power. Here, forming of the pits on the disc as long as a predetermined length is called a write strategy.

At this time, the laser beam is incident from the opposite side of a reflecting surface where the pits are located. Accordingly, seen from the laser incident surface, the pits look like projections.

The pit has a width of 0.4~0.6 μm, and the length of the pit and the space between the pits are determined in the range of 3T to 11T in case of the CD series and in the range of 3T to 14T in case of the DVD series. Here, T is the length of one clock pulse, 3T means three clock pulses, and 11T corresponds to the length of 11 clock pulses.

At this time, the optical disc recording/reproducing apparatus performs an optimum power calibration (OPC) process for selecting the recording power suitable for the corresponding disc in case of recording information on the rewritable optical disc such as the CD-R/RW. For this, the rewritable optical disc is provided with a power calibration area (PCA) that is a test area for determining the recording power in an unused area of the innermost periphery of the disc.

FIG. 1A is a layout diagram of a recording area of a general CD-R/CD-RW disc. The disc is divided into a clamping area 10 being clamped by a clamper, and a recording area 20 where data is recorded and reproduced. The recording area 20 includes a power calibration area (PCA) 22 for determining a proper laser power for the data to be recorded in a radius direction, a program memory area (PMA) 24 having information on the data being recorded, a lead-in area 26 for recording the information on the recorded data, a user data area 28 where user data is recorded, and a lead-out area 30 located on the outermost periphery.

The PCA 22 is divided into a test area for testing the laser power during performing the OPC, and a count area for recording the number of tests, i.e., the number of repeated recordings, as shown in FIG. 1B. Each of the test area and the count area is divided into 100 partitions so that the OPC is performed 100 times. Accordingly, the test can be performed 100 times, and if the number of tests exceeds 100, no more recording is possible even if any recording space remains.

At this time, as shown in FIG. 1C, one partition of the test area is composed of 15 sectors, and one partition, which is composed of 15 sectors, is used for one test write. That is, if the OPC is performed once, it is possible to perform the test write for 15 sectors with the laser output of 15 levels.

For this, the optical disc recording/reproducing apparatus reads an absolute time in pre-groove (ATIP) recorded on the disc, divides the recording power into 15 levels on the basis of the standard power recommended by disc makers, and writes a random or nT eight-to-fourteen modulation (EFM) signal in the test area of the PCA 22. Then, the apparatus reproduces the signal, judges the recording power to be most proper when a peak hold and a bottom hold of the reproduced signal are properly balanced, and writes data in a recordable user area 28 with this recording power value. The standard power is encoded with special information of the ATIP in the read-in area, and has a wavelength of 785 nm at a single speed.

Specifically, after recording the random data or the nT EFM signal in the test area, the apparatus checks positive and negative pits of a high-fidelity (HF) signal for each recording power as shown as a waveform in FIG. 2, and determines the power in which the value of the parameter β ($β=(|A1|-|A2|)/(|A1|+|A2|)$) is '0', i.e., becomes symmetric, to be the optimum recording power during the reproduction.

However, since it is difficult in practice to search the recording power that is accurately '0', the CD-R/RW standard recommends to determine the recording power in which the value of the parameter β is about 0.04 (i.e., 0.4%) as the optimum recording power. If a plurality of recording powers are included in the asymmetric allowable range, the apparatus determines the recording power having the minimum degree of asymmetry as the optimum recording power.

FIGS. 3A to 3C are waveform diagrams in case that the RF signal reproduced in the test area is AC-coupled.

FIG. 3A shows an asymmetric waveform appearing when the power P recorded in the test area is lower than the disc optimum power Po (i.e., P<<Po), and FIG. 3C shows an asymmetric waveform appearing when the power P recorded in the test area is higher than the disc optimum power Po (i.e., P>>Po). FIG. 3B shows a symmetric waveform appearing when the power P recorded in the test area accurately matches the disc optimum power Po (i.e., P≅Po). For example, if the data is recorded in the test area with the optimum recording power, the AC-coupled RF signal waveform becomes a symmetric waveform centering around the reference level Vref (i.e., 0) as shown in FIG. 3B.

Accordingly, if the power recorded in the test area is as shown in FIG. 3B, the value of the parameter β (β=(|A1|−|A2|)/(|A1|+|A2|)) becomes nearly '0'.

At this time, there may be various methods of detecting the optimum recording power. The above-described method is called an asymmetric method, and is typically applied to the CD-R disc.

Meanwhile, the CD-R is different from the CD-RW in recording material, and the asymmetric characteristic of the CD-RW is inferior to that of the CD-R. Also, in case of the CD-RW, the repeated recording characteristic should be secured, and thus it is difficult even to use a high power. Accordingly, in order to detect the optimum recording power in the CD-RW, a modulation amplitude method as shown in FIGS. 4 and 5 has been applied.

Specifically, after recording the random data or the nT EFM signal in the test area, the apparatus checks light quantities of a peak level and a bottom level of the RF signal reflected from the test area as shown as the waveform in FIG. 4. Then, the apparatus obtains the modulation amplitude (m) by computing the checked light quantities by the following equation 1. Then, the apparatus determines the optimum recording power using the modulation amplitude curve and gamma (γ) curve as shown in FIG. 5.

$$m=(|Top|-|Bottom|)/|Top| \quad \text{[Equation 1]}$$

Here, the gamma (γ) curve is a normalized slope of the function m(Pw), and is expressed by the variation amount of the modulation amplifier and the variation amount of the recording power as in the following equation 2. The Pw is the recording power being recorded in the test area.

$$\gamma=(dm/dPw)\cdot(Pw/m) \quad \text{[Equation 2]}$$

At this time, the optimum recording power Po is determined by multiplying the recording power Pt corresponding to the predetermined gamma target ($\gamma_t$) value by a multiplication factor (ρ). Here, the $\gamma_t$ value and the multiplication factor ρ, in the same manner as the above-described standard power, are predetermined during the manufacturing of the disc, and then encoded with the special information of the ATIP in the read-in area. These values may be differently determined according to the kind of disc and the maker.

Meanwhile, the DVD-series disc such as the DVD-R/RW also has the PCA area for the optimum recording as in the CD-R/RW. However, it is not prescribed in the rules how to use it, and thus it is necessary to find a method of searching the optimum recording power in the DVD-R/RW.

At this time, though the DVD-R/RW has both the land and groove signal tracks, the data is recorded only on the groove signal track. Specifically, the DVD-R/RW records position information on the groove track by pre-pitting the land track, but does not record data on the land track. At this time, the position information in the land track is called a land-pre-pit (LPP). That is, information on the physical address of the groove track is pre-recorded on the land track in the form of a pit. Also, the position information such as address information may be recorded in a wobbling shape along the boundary surface of the track.

Here, the wobbling means the recording of control information on the boundary surface of the track according to the variation of the optical beam of the corresponding laser by supplying information on the corresponding position, information on the rotating speed of the disc and so on to the power of the laser diode.

FIGS. 6A and 6B show examples of the PCA area of the DVD-R/RW. In detail, FIG. 6A shows an example of the LPP structure of the DVD-R/RW, and FIG. 6B shows an example of the LPP signal appearing in a tracking error signal detected by a push-pull method in the DVD-R/RW. In case of the DVD-R/RW, the LPP signal pre-recorded on the land is detected, and the address information representing the position of the track, sync signal, etc., are detected.

At this time, in case of the DVD-R/RW, the recording/reproduction of the data is performed in the unit of an ECC block, i.e., in the unit of 16 sectors. Also, the respective physical sector is composed of 26 sync frames. At this time, the LPP data is recorded on even sync frames (for example, 0, 2, 4, 6, . . . ) of the physical sector as shown in FIG. 7A, or on odd sync frames (for example, 1, 3, 5, 7, . . . ) of the physical sector as shown in FIG. 7B. In one physical sector is recorded the LPP data of 39 bits.

Here, for the convenience in explanation, the sector of which the LPP data is recorded on the even sync frames is called an even sector, and the sector of which the LPP data is recorded on the odd frames is called an odd sector. Also, the even sync frame is used to have the same meaning as the even position, and the odd frame is used to have the same meaning as the odd position.

As shown in FIG. 6B, the LPP data b0b1b2 carried in the start position of the even sector, i.e., in the first sync frame of the even sector, is 111, and the LPP data b0b1b2 carried in the second sync frame of the odd sector is 110. In case of the odd sector, the LPP data is recorded in the second sync frame to prevent the LPP data from overlapping with the LPP data being recorded in the start position of the even sector. Here, b0b1b2 is called sync bits for the convenience in explanation.

Accordingly, it can be discriminated using the sync bits b0,b1,b2 whether the present sector is the even sector or the odd sector. That is, if the sync bits b0,b1,b2 are 111, it is the even sector where the LPP data is recorded in the even sync frames, i.e., the even positions, of the sector. If the sync bits b0,b1,b2 are 110, it is the odd sector where the LPP data is recorded in the odd sync frames, i.e., the odd positions.

Also, the first sector of the respective ECC block is the even sector where the LPP data is always carried in the even sync frames.

Meanwhile, though the DVD-series disc such as the DVD-R/RW has the PCA area for the optimum recording as in the CD-R/RW, it is not prescribed in the rules how to use it. Accordingly, it is necessary to find a method of searching the optimum recording power in the DVD-R/RW.

Also, in case of the CD-R/RW, since the capacity of the PCA area is limited, the OPC cannot be performed even in the state that the remaining recording space exists or further recording is possible, and thus the recording cannot be performed any more. This problem may also occur in case of the DVD-R/RW.

In case of the DVD-R/RW, the physical sectors are classified into the even sectors and odd sectors as described above, and since the LPP data is carried in the second sync frame of the odd sector, the star position of the odd sector cannot be searched. Accordingly, the OPC may not be performed in the odd sectors.

SUMMARY OF THE INVENTION

Accordingly, the present invention is directed to an apparatus and method of generating an optimum recording power that substantially obviates one or more problems due to limitations and disadvantages of the related art.

An object of the present invention is to provide an apparatus and method of generating an optimum recording power by performing an optimum power calibration (OPC) in the unit of a sector.

Another object of the present invention is to provide an apparatus and method of generating an optimum recording power that can detect start positions of odd sectors by sector synchronization, and perform an OPC in the unit of a sector even in the odd sectors.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of generating an optimum recording power for an optical recording medium in which land and groove signal tracks composed of a plurality of sectors are provided, data can be recorded in one of the signal tracks, and position information on the data-recordable signal track is pre-pitted by a high frequency signal and recorded in the other signal track, and control information is wobbled in the signal tracks, includes the steps of synchronizing the sectors of a test area on the optical recording medium to perform an optimum power calibration (OPC); generating a recording pattern for performing the OPC; recording the recording pattern in a specified sector of the synchronized unrecorded test area as changing a recording power on the basis of a reference recording power recorded on the optical recording medium; reproducing the data recorded in the specified sector with the respective changed recording power, and determining the optimum recording power from the characteristic of a reproduced signal; and recording user data in a predetermined user data area of the optical recording medium with the determined optimum recording power.

The synchronizing step comprises the steps of detecting the signal wobbled on the signal track; PLL-locking the wobble signal, and outputting the PLL-locked wobble signal; and detecting a start position of the respective sector by counting the PLL-locked wobble signal.

The counting step resets and starts the counting operation in the start position of a first sector of an ECC block that is a data recording/reproducing unit.

At the recording step, in the specified sector where the OPC is performed is recorded the recording pattern generated at the recording pattern generating step as the recording power is changed for every two synch frames.

The recording pattern generating step may generate a longest time period (T) (corresponding to a length for one clock pulse) and a shortest T as the recording pattern, and record the longest T and the shortest T with the same recording power for every two sync frames in the corresponding sector.

In the above case, the optimum recording power determining step comprises the steps of generating a radio frequency (RF) signal using electric signals corresponding to a light quantity reflected from the sector where the OPC is performed; AC-coupling the RF signal, and biasing the AC-coupled RF signal with a reference voltage; detecting a peak envelope and a bottom envelop of the AC-coupled and biased RF signal; detecting an asymmetric characteristic of the longest T and the shortest T for the respective recording power from the peak envelop and the bottom envelop; and determining the recording power having a minimum degree of asymmetry in condition that the asymmetric characteristic is within an allowable range as the optimum recording power.

The recording pattern generating step may generate a longest time period (T) as the recording pattern, and record the longest T with the same recording power for every two sync frames in the corresponding sector.

In the above case, the optimum recording power determining step comprises the steps of generating a radio frequency (RF) signal using electric signals corresponding to a light quantity reflected from the sector where the OPC is performed; detecting a peak envelope and a bottom envelop of the RF signal; detecting a modulation amplitude of the longest T for the respective recording power from the peak envelop and the bottom envelop; generating a gamma curve by obtaining a change rate of the modulation amplitude and a change rate of the recording power; and selecting the recording power corresponding to a predetermined gamma target in the gamma curve, and determining the optimum recording power by multiplying the selected recording power by a predetermined multiplication factor.

The recording pattern generating step may generate a long T having a saturation characteristic and a short T having no saturation characteristic as the recording pattern, and record the long T and the short T with the same recording power for every two sync frames in the corresponding sector.

In the above case, the optimum recording power determining step comprises the steps of generating an RF signal using electric signals corresponding to a light quantity reflected from the sector where the OPC is performed; detecting a peak envelope and a bottom envelop of the RF signal; detecting a center voltage of the long T and a center voltage of the short T for the respective recording power from the peak envelop and the bottom envelop; and determining the recording power obtained when the coincidence degree of the center voltage of the long T and the center voltage of the short T detected in a saturation area of the long T is within an allowable range as the optimum recording power.

The recording pattern generating step may generate a single recording pattern of nT, and record the nT with the same recording power for every two sync frames in the corresponding sector.

In the above case, the optimum recording power determining step comprises the steps of generating an RF signal using electric signals corresponding to a light quantity reflected from the sector where the OPC is performed; AC-coupling the RF signal, and biasing the AC-coupled RF signal with a reference voltage; detecting a jitter characteristic of the AC-coupled and biased RF signal for the respective recording power; and determining the recording power in a jitter allowable range as the optimum recording power.

The OPC is performed in a direction from an inner periphery to an outer periphery of the test area, and the recording at this time is performed from a low power to a high power.

The OPC is performed in a direction from an outer periphery to an inner periphery of the test area, and the recording at this time is performed from a high power to a low power.

In another aspect of the present invention, an apparatus for generating an optimum recording power for an optical recording medium in which land and groove signal tracks composed of a plurality of sectors are provided, data can be recorded in one of the signal tracks, and position information on the data-recordable signal track is pre-pitted by a high frequency signal and recorded in the other signal track, and control information is wobbled in the signal tracks, includes a control section for detecting a start position of the respective sector of a test area by counting a PLL-locked wobble signal, and controlling generation of a recording pattern and a recording power for performing an optimum power calibration (OPC); an encoding section for detecting and PLL-locking the wobble signal formed on the track using an electric signal of a reflected light quantity outputted from the optical recording medium, detecting and decoding a pre-pit signal, and generating the recording pattern for performing the OPC; a laser power control section for dividing the recording power into several levels on the basis of a reference recording power recorded on the optical recording medium under the control of the control section and outputting the recording power levels; a recording section for sequentially recording the recording pattern in a specified sector of the unrecorded test area with the several recording power levels changed by and outputted from the laser power control section; and an optimum recording power determining section for reproducing the data recorded in the specified sector for the respective recording power level, and determining an optimum recording power from the characteristic of a reproduced signal.

The control section searches the sector of the unrecorded test area where the OPC is to be performed, and controls the recording of the recording pattern generated by the encoding section as changing the recording power for every N (N is a natural number) sync frames in the searched specified sector.

In case that the encoding section generates a longest time period (T) (corresponding to a length for one clock pulse) and a shortest T as the recording pattern, and the recording section records the longest T and the shortest T with the same recording power for every N sync frames in the corresponding sector, the optimum recording power determining section includes a radio frequency (RF) signal generating section for generating an RF signal using the electric signals corresponding to the light quantity reflected from the sector where the OPC is performed; an RF signal processing section for AC-coupling the RF signal, and biasing the AC-coupled RF signal with a reference voltage; an RF envelop detecting section for detecting a peak envelope and a bottom envelop of the AC-coupled and biased RF signal; and a determining section for detecting an asymmetric characteristic of the longest T and the shortest T for the respective recording power from the peak envelop and the bottom envelop of the RF signal, and determining the recording power having a minimum degree of asymmetry in condition that the asymmetric characteristic is within an allowable range as the optimum recording power.

In case that the encoding section generates a longest T as the recording pattern, and the recording section records the longest T with the same recording power for every N sync frames in the corresponding sector, the optimum recording power determining section includes an RF signal generating section for generating an RF signal using the electric signals corresponding to the light quantity reflected from the sector where the OPC is performed; an RF envelop detecting section for detecting a peak envelope and a bottom envelop of the RF signal; and a determining section for detecting a modulation amplitude of the longest T for the respective recording power from the peak envelop and the bottom envelop of the RF signal, generating a gamma curve by obtaining a change rate of the modulation amplitude and a change rate of the recording power, selecting the recording power corresponding to a predetermined gamma target in the gamma curve, and determining the optimum recording power by multiplying the selected recording power by a predetermined multiplication factor.

In case that the encoding section generates a long T having a saturation characteristic and a short T having no saturation characteristic as the recording pattern, and the recording section records the long T and the short T with the same recording power for every N sync frames in the corresponding sector, the optimum recording power determining section includes an RF signal generating section for generating an RF signal using the electric signals corresponding to the light quantity reflected from the sector where the OPC is performed; an RF envelop detecting section for detecting a peak envelope and a bottom envelop of the RF signal; and a determining section for detecting a center voltage of the long T and a center voltage of the short T for the respective recording power from the peak envelop and the bottom envelop of the RF signal, determining the recording power obtained when the coincidence degree of the center voltage of the long T and the center voltage of the short T detected in a saturation area of the long T is within an allowable range as the optimum recording power.

In case that the encoding section generates a single recording pattern of nT, and the recording section records the nT with the same recording power for every N sync frames in the corresponding sector, the optimum recording power determining section includes an RF signal generating section for generating an RF signal using the electric signals corresponding to the light quantity reflected from the sector where the OPC is performed; an RF signal processing section for AC-coupling the RF signal, and biasing the AC-coupled RF signal with a reference voltage; a jitter detecting section for detecting a jitter characteristic of the AC-coupled and biased RF signal for the respective recording power; and a determining section for determining the recording power in a jitter allowable range as the optimum recording power.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 12A to 12D are views illustrating examples of recording of the OPC data and determination of the optimum recording power according to the flowchart of FIG. 11.

DETAILED DESCRIPTION OF THE INVENTION

Reference will now be made in detail to the preferred embodiments of the present invention, examples of which are illustrated in the accompanying drawings.

First Embodiment

Figure 1A:
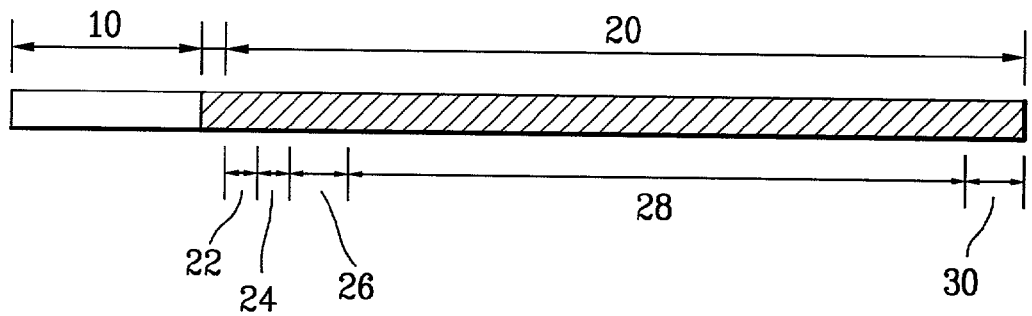
FIG. 1A is a view illustrating the structure of a general CD-R/RW disc.
Figure 1B:
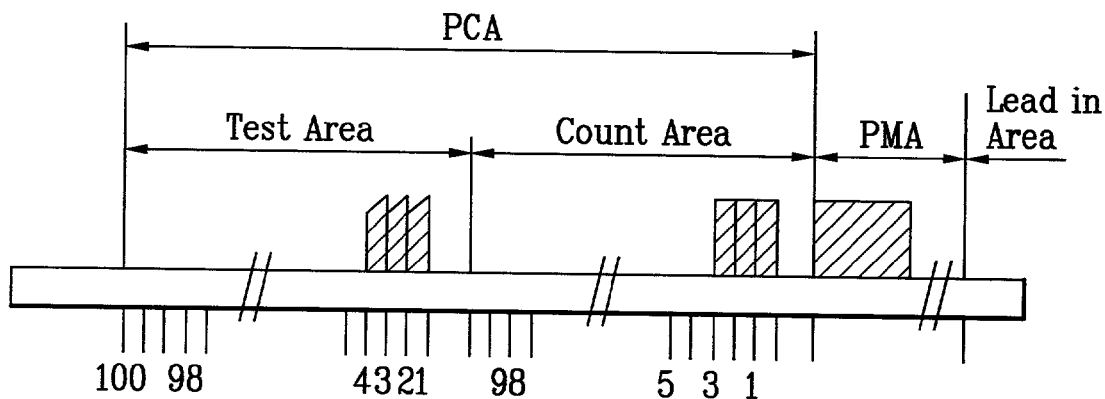
FIGS. 1B and 1C are views illustrating the format of the PCA on the disc of FIG. 1A.
Figure 1C:
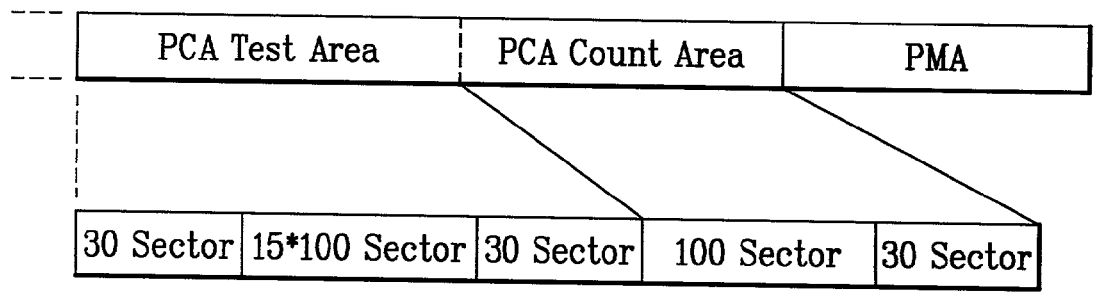
Figure 2:
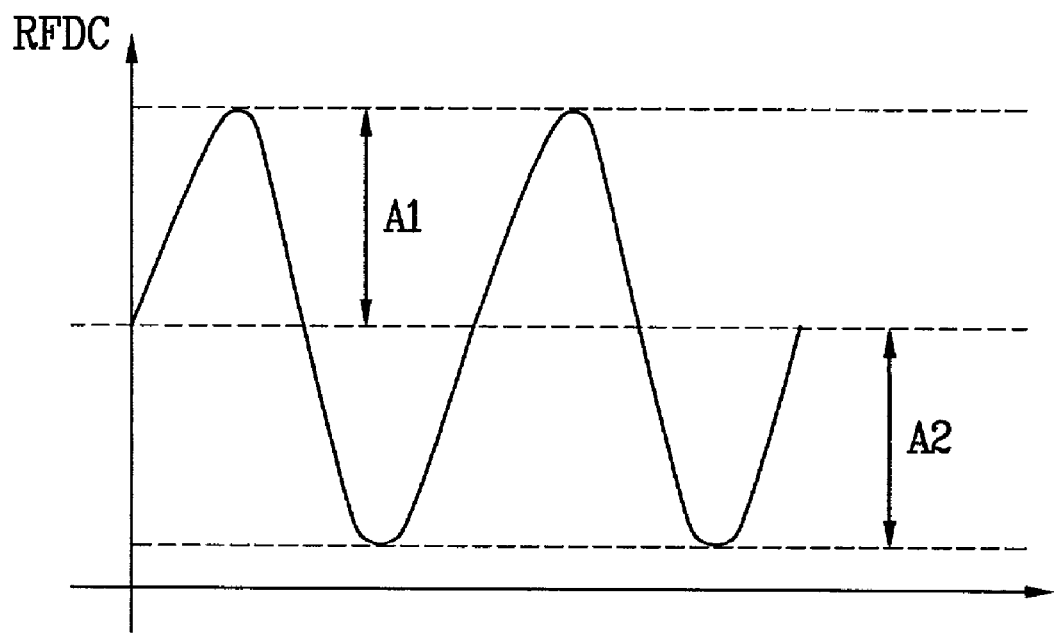
FIG. 2 is a waveform diagram defining the beta (β) that is the asymmetric characteristic of the general CD-R disc.
Figure 3:
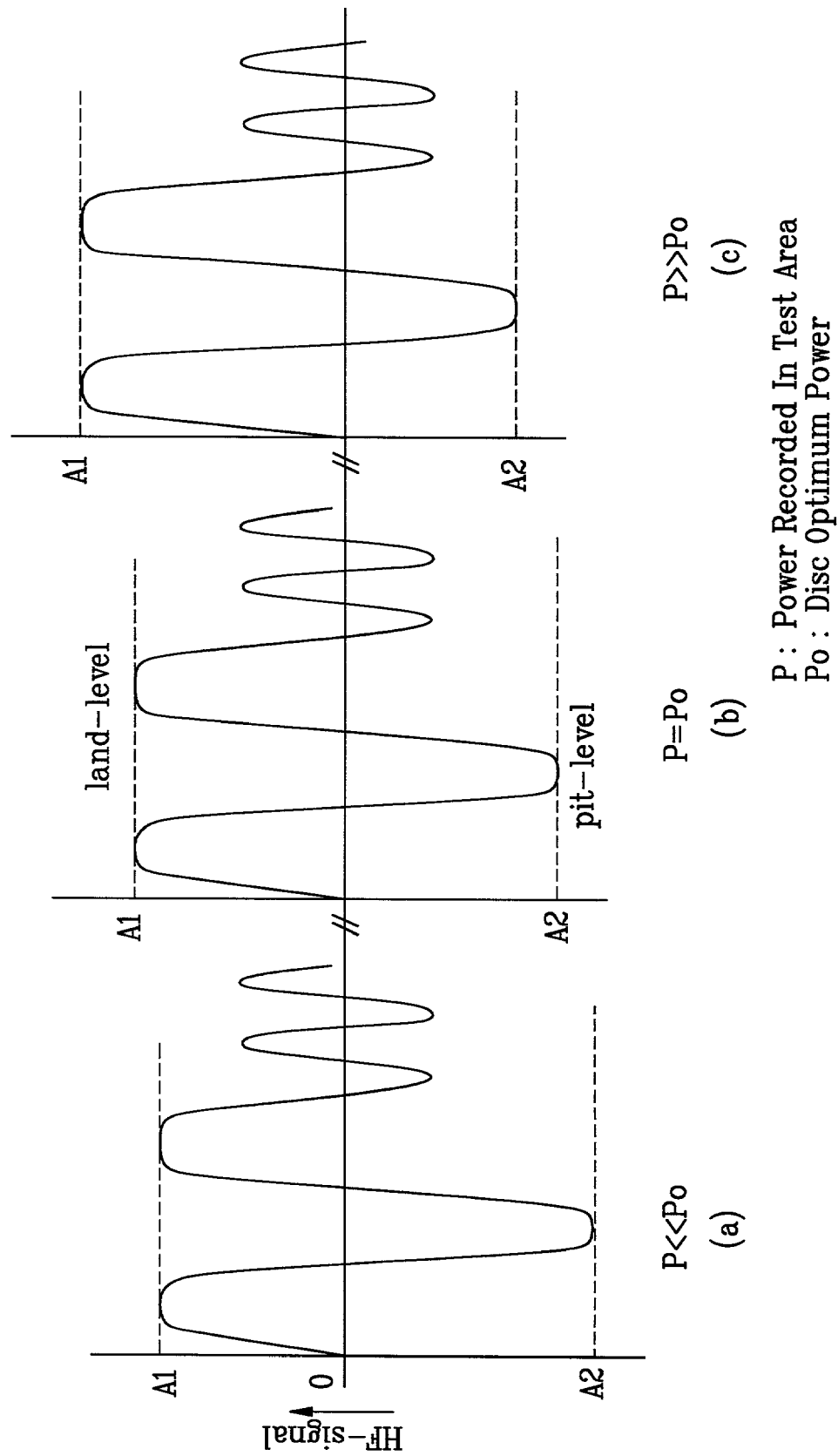
FIGS. 3A to 3C are waveform diagrams illustrating the AC-coupled high-fidelity signal for the respective recording power in the CD-R disc of FIG. 2.
Figure 4:
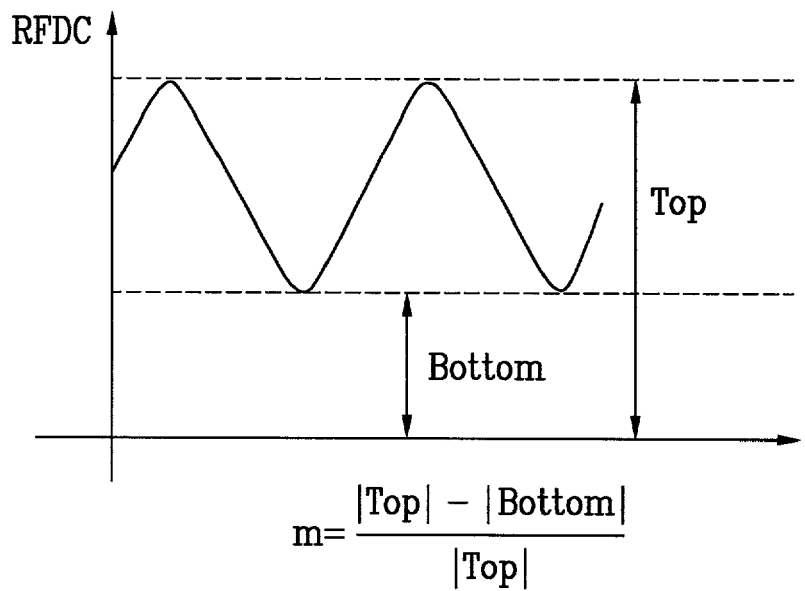
FIG. 4 is a waveform diagram defining the modulation amplitude characteristic in the general CD-R disc.
Figure 5:
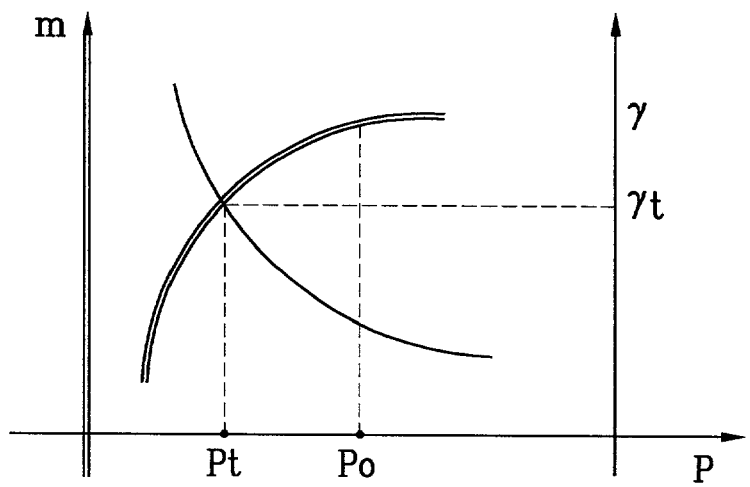
FIG. 5 is a graph of a gamma curve obtained using the change rate of the modulation amplitude and the change rate of the recording power of FIG. 4.
Figure 6A:
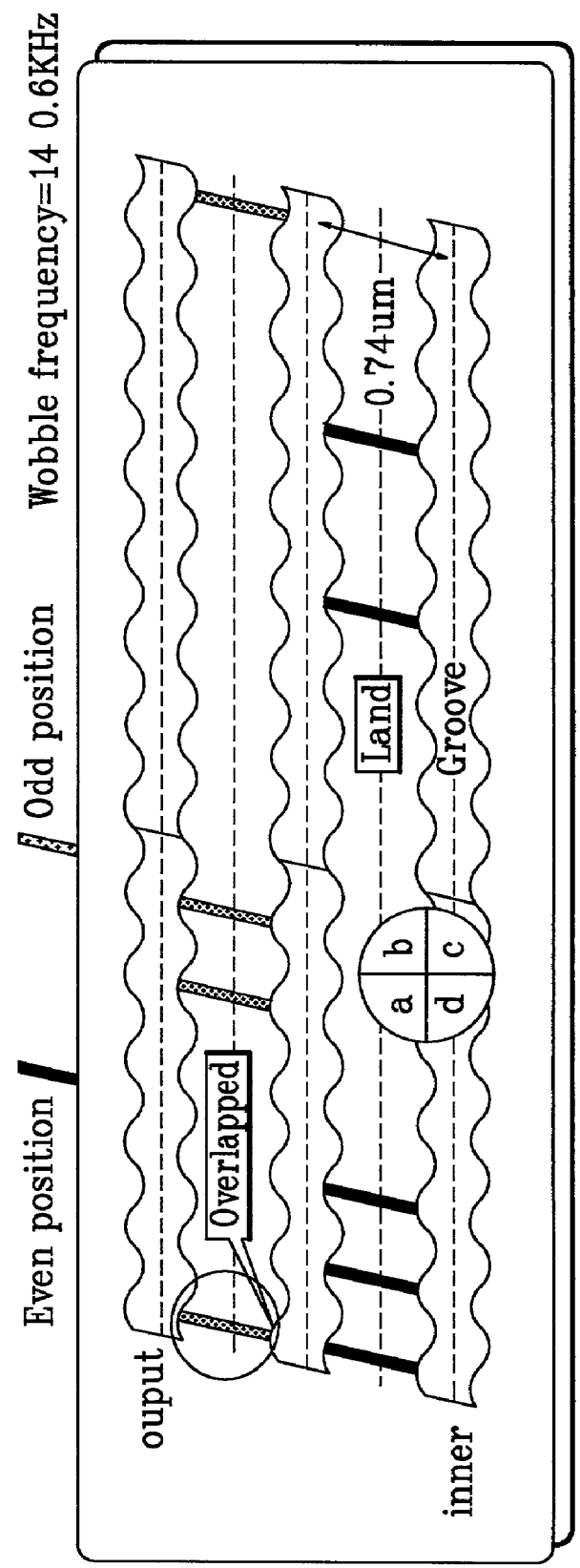
FIG. 6A is a view illustrating the LPP structure in a general DVD-R/RW disc.
Figure 6B:
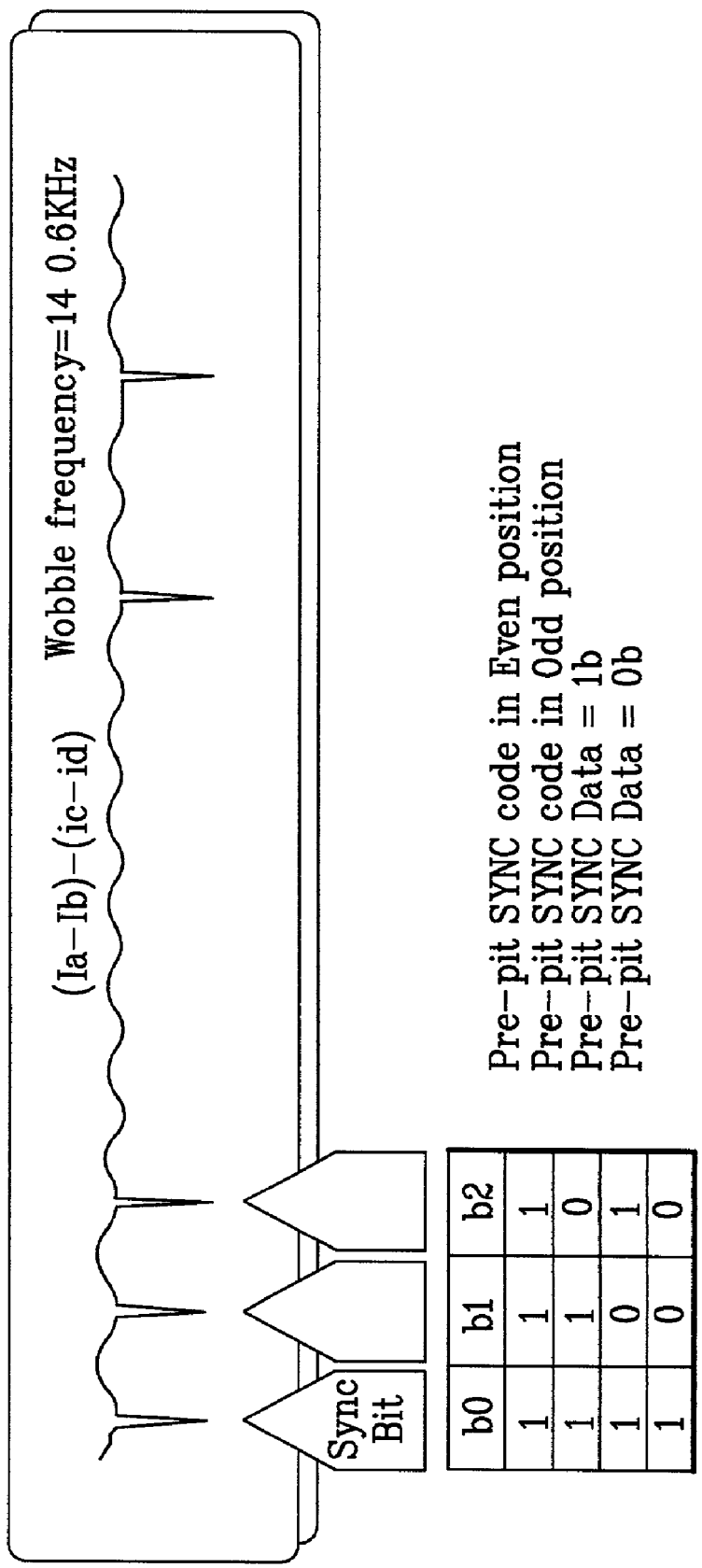
FIG. 6B is a view illustrating an example of the LPP signal in the DVD-R/RW disc of FIG. 6A.
Figure 7A:
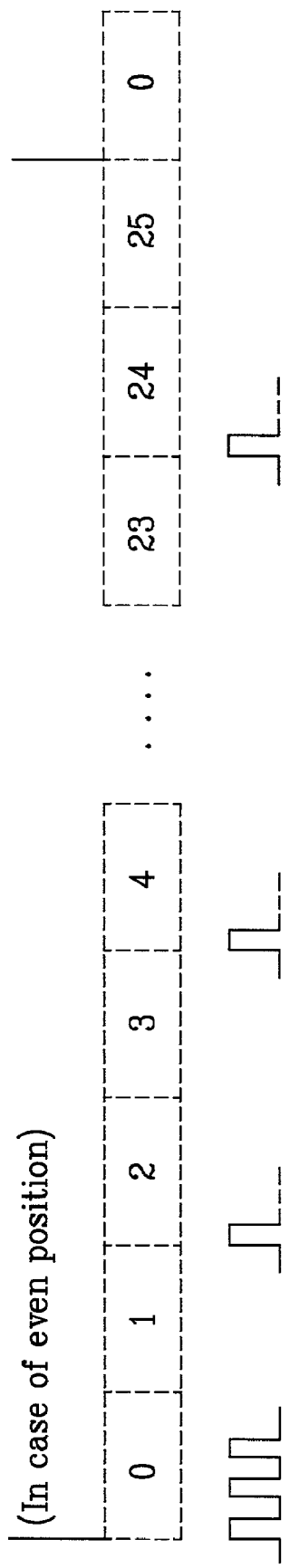
FIG. 7A is a general view illustrating an example of a sector where the LPP data is recorded in even positions.
Figure 7B:
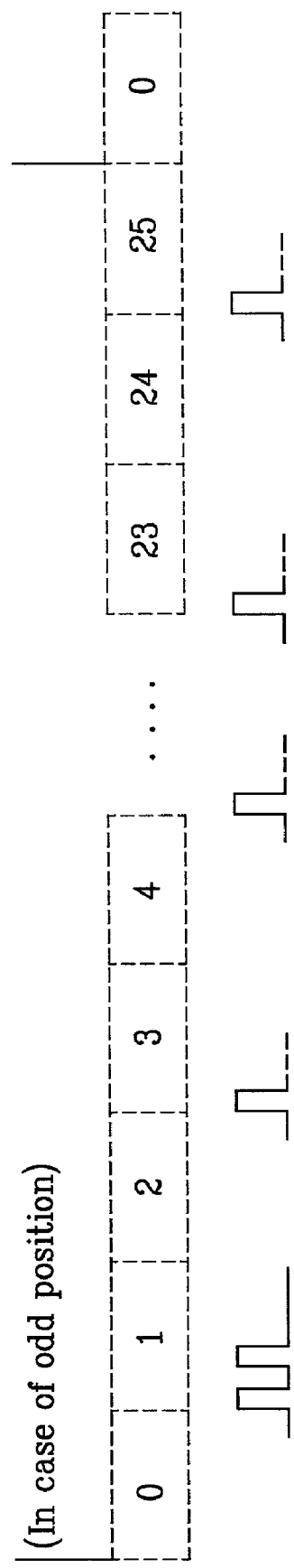
FIG. 7B is a general view illustrating an example of a sector where the LPP data is recorded in odd positions.
Figure 8:
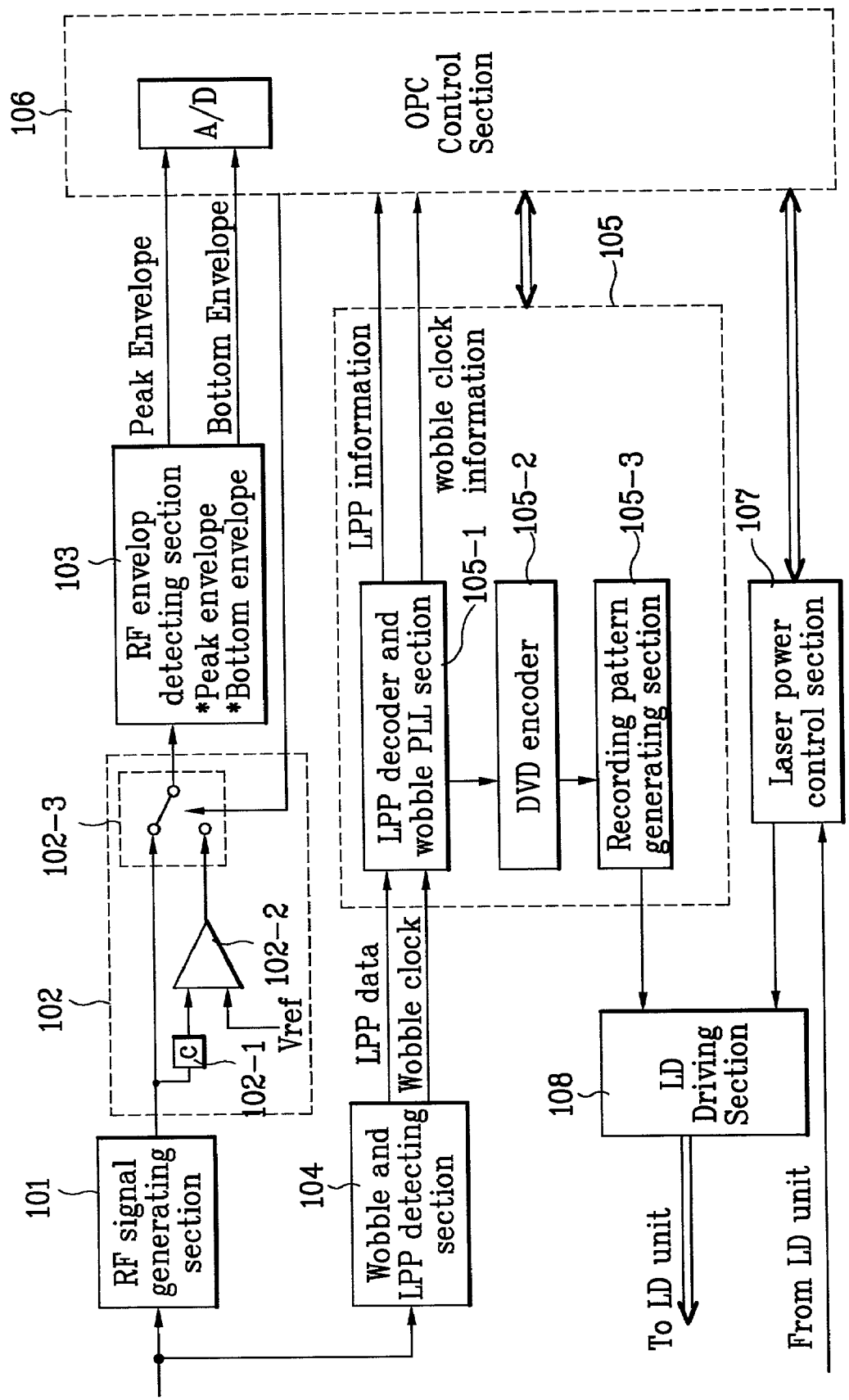
FIG. 8 is a block diagram illustrating the construction for determining the optimum recording power in an optical recording/reproducing apparatus according to a first embodiment of the present invention.

FIG. 8 is a block diagram illustrating the construction of the optical disc recording/reproducing apparatus according to the first embodiment of the present invention. In FIG. 8, OPC-related blocks are illustrated.

Referring to FIG. 8, the apparatus for generating an optimum recording power for an optical recording medium according to the present invention includes an RF signal generating section 101 for generating an RF signal by combining electric signals of reflected light quantity outputted from an optical pickup (not illustrated), an RF signal processing section 102 for bypassing or AC-coupling the RF signal 102, an RF envelop detecting section 103 for detecting a peak envelop and a bottom envelop from the bypassed RF signal or AC-coupled RF signal, a wobble and LPP detecting section 104 for generating a push-pull signal by combining electric signals corresponding to a reflected light quantity outputted from the optical pickup, and detecting a wobble clock and LPP data from the push-pull signal, an encoding section 105 for phase-locking the wobble clock from the wobble and LPP detecting section 104, decoding the LPP data, and generating a recording pattern to be recorded on the disc, an OPC control section 106 for receiving the peak envelop and the bottom envelop, controlling the OPC, and outputting a selection signal to the RF signal processing section 102 according to an optimum recording power generating method, a laser power control section 107 for generating a recording power under the control of the OPC control section, and a laser diode (LD) driving section 108 for recording the recording pattern outputted from the encoding section 105 with the recording power provided from the laser power control section 107.

In the apparatus constructed as described above, the RF signal generating section 101 generates the RF signal by combining (i.e., a+b+c+d) the electric signals a, b, c, and d of the reflected light quantity outputted from optical detectors in the optical pickup, and outputs the RF signal to the RF signal processing section 102. The RF signal processing section 102 directly bypasses the RF signal to a switching section 102-3, or AC-couples the RF signal, and then biases the AC-coupled RF signal with a reference voltage before outputting the RF signal to the switching section 102-3. Specifically, a capacitor 102-1 AC-couples the input RF signal to output the AC-coupled RF signal to a buffer 102-2, and the buffer 102-2 carries a bias voltage of Vref on the AC-coupled RF signal to output the biased RF signal to the switching section 102-3. Thus, the AC component of the RF signal is carried on the basis of the reference voltage Vref.

The switching section 102-3 selects one of the bypassed RF signal and the AC-coupled and biased RF signal under the control of the OPC control section 106, and outputs the selected RF signal to the RF envelop detecting section 103.

For example, if the optimum recording power generating method is the modulation amplitude method, the OPC control section 106 outputs the control signal so as to select the bypassed RF signal, while if the optimum recording power generating method is the asymmetric method, the OPC control section 106 outputs the control signal so as to selects the AC-coupled and biased RF signal. The selected RF signal is outputted to a switching section 102-3 in the RF signal processing section 102.

The RF envelop detecting section 103 detects the peak envelop and the bottom envelop from the input RF signal to output the detected envelops to the OPC control section 106.

Meanwhile, the wobble and LPP detecting section 104 generates a tracking error signal by combining the electric signals a, b, c, and d of the reflected light quantity outputted from the optical detectors in the optical pickup by a push-pull method, and then detects the wobble clock and the LPP signal from the tracking error signal. The wobble clock and the LPP signal are outputted to an LPP decoder and wobble PLL section 105-1 in the encoding section 105.

The LPP decoder and wobble PLL section 105-1 generates a high frequency clock to be used for the recording by phase-locking the wobble clock. Then, the LPP decoder and wobble PLL section generates a phase-locked-looped (PLL-locked) wobble clock by properly dividing the high frequency clock, and outputs the PLL-locked wobble clock to the OPC control section 106 and a DVD encoder 105-2. Also, the LPP decoder and wobble PLL section 105-1 detects a physical address, sync pattern, etc., required for the OPC by decoding the LPP signal with the PLL-locked wobble clock, and outputs the decoded LPP signal to the OPC control section 106.

Meanwhile, the DVD encoder 105-2 encodes the data provided from a personal computer (PC) or the OPC control section 106, and outputs the encoded data to a recording pattern generating section 105-3. The recording pattern generating section 105-3 generates the recording pattern from the encoded data according to the write strategy required for each disc.

Especially, in case of performing the OPC, it is also possible that the DVD encoder 105-2 generates a specific pattern for the OPC (for example, in case of the asymmetric method, 14T and 3T, and in case of the modulation amplitude method, 14T), or the recording pattern generating section 105-3 directly generates the recording pattern.

The recording pattern generated by the recording pattern generating section 105-3 is outputted to an LD driving section 108 as an LD drive signal.

The LD driving section 108 converts an LD drive voltage into an LD drive current, amplifies the LD drive current, and drives the LD in the optical pickup by the LD drive current. At this time, the recording power of the LD driving section 108 is controlled through the laser power control section 107 controlled by the OPC control section 106.

Meanwhile, the OPC control section 106 controls the OPC so that the recording is performed with the optimum recording power during the recording operation. That is, in order to detect the optimum recording power from a certain pre-recorded pattern, the OPC control section 106 stored in its storage area the respective power levels and write strategies applied during the recording operation. Also, the OPC control section 106 receives the peak envelop and the bottom envelop detected from the recorded pattern from the RF envelop detecting section 104, and converts them into a digital signal through an analog-to-digital (A/D) converter. The OPC control section 106 obtains information from the digital signal, and determines the optimum recording power through a proper method (for example, the modulation amplitude method or asymmetric method).

Especially, when performing the recording for the OPC, the OPC control section plans the recording pattern and the recording power level, and performs the recording in the test area of the PCA of the disc according to the method. At this time, the recording pattern is provided through the encoding section 105, and the recording power is provided through the laser power control section 107.

According to the first embodiment of the present invention, the OPC is performed using the modulation amplitude method or the asymmetric method in the unit of a sector.

Conventionally, the recording power in one sector is the same, and the level of the recording power is changed for each sector. For example, the OPC is performed once for 15 sectors, the test write is performed by 15 levels for 15 sectors, and the optimum recording power is selected through reproduction of the recording power.

However, according to the present invention, the OPC is performed once for one sector, the test write is performed in one sector with the recording power of several levels, and the optimum recording power is selected through reproduction of the recording power.

For example, in the present invention, the recording is performed in the test area with the recording power of 13 levels for one sector. Since one sector is composed of 26 sync frames, the recording power is changed for every two sync frames. This means that two sync frames are recorded with the recording power that is the same as the recording power generated in the DVD encoder 105-2 or the recording pattern generating section 105-3, and the level of the recording power is changed for every two sync frames.

At this time, in case that the optimum recording power selecting method is the asymmetric method, the pattern recorded in the first sync frame of the two sync frames where the recording is performed with the same recording power is determined to be 14T, and the pattern recorded in the second sync frame is determined to be 3T. Also, in case that the optimum recording power selecting method is the modulation amplitude method, the pattern recorded in the two sync frames where the recording is performed with the same recording power is determined to be 14T. The reason and the performing method thereof will be explained in detail later.

According to the present invention, the sector synchronization is first performed before the OPC is performed.

In case of the even sector, the synchronization code is recorded in the first sync frame, and thus the corresponding recording pattern can be recorded in the start position of the even sector. However, in case of the even sector, the synchronization code is recorded in the second sync frame, and thus the first sync frame, i.e., the start position, of the odd sector should be searched in order to perform the OPC in the odd sector. In other words, though one sector is composed of 26 sync frames, they have no marking, and thus the start position cannot be searched in case of the odd sector.

In the present invention, this is called a sector synchronization, which is performed by counting the wobble clock.

Specifically, one physical sector is composed of 26 sync frames, and the number of PLL-locked wobble clocks at this time is 208. Thus, one sync frame is composed of 8 wobble clocks (=208/26).

According to the present invention, the start position of the even sector and the start position of the odd sector are detected by counting the wobble clock. For this, the start time point of the wobble clock counting should be first determined.

That is, since the DVD-R/RW performs recording/reproduction of data in the unit of an ECC block, and the LPP data is always recorded in the even sector, i.e., the even position, of the first sector of the respective ECC block, the apparatus according to the present invention determines the start position of the first sector of the ECC block as the start time point of counting, and then starts the counting. Thereafter, the start positions of the even sector and the odd sector are detected using the number of counted wobble clocks.

At this time, the counted number in the start position of the odd sector is changed according to the dividing rate of the wobble clocks divided by the LPP decoder and wobble PLL section 105-1.

In the embodiment of the present invention, it is assumed that the wobble clocks are divided by 8 in the start position of the even sector where the counting starts.

Thus, the 8-divided wobble clocks for each sync frame are toggled to a high/low state. This is because one sync frame is composed of 8 wobble clocks. Specifically, if the wobble clocks are divided by 8 in the LPP decoder and wobble PLL section 105-1, the high/low state is repeated for each sync frame, and the number of wobble clocks counted during one sector becomes 13. At this time, if the sync frames of the corresponding sector are even (for example, 0, 2, 4, . . . ) when the 8-divided wobble clock is in a high state, the sync frames of the corresponding sector become odd when the divided wobble clocks are low. Accordingly, in case that the optimum recording power is selected to be the asymmetric method, 14T is recorded when the 8-divided wobble clock is high, while 3T is recorded with the same recording power as that of 14T when the wobble clock is low.

For example, if the counting starts in the start position of the ECC block, the OPC control section 106 judges that a rising edge of the 8-divided wobble clock counted fourteenth time is the start position of the first odd sector of the corresponding ECC block. By repeating this process, the even sector and the odd sector in the respective ECC block can be easily discriminated from each other, and the start positions of the even sector and the odd sector can be accurately detected as well.

As described above, even in case of the odd sector where the LPP data is recorded in the odd sync frames, the start position can be accurately detected, and thus the OPC can be performed in the unit of a sector even in the odd sector.

At this time, in the OPC performed in the unit of a sector from the start position of the respective sector, the recording pattern and the recording power are changed according to the optimum recording power selecting method. Hereinafter, the asymmetric method and the modulation amplitude method will be explained in a separate manner.

Figure 9:
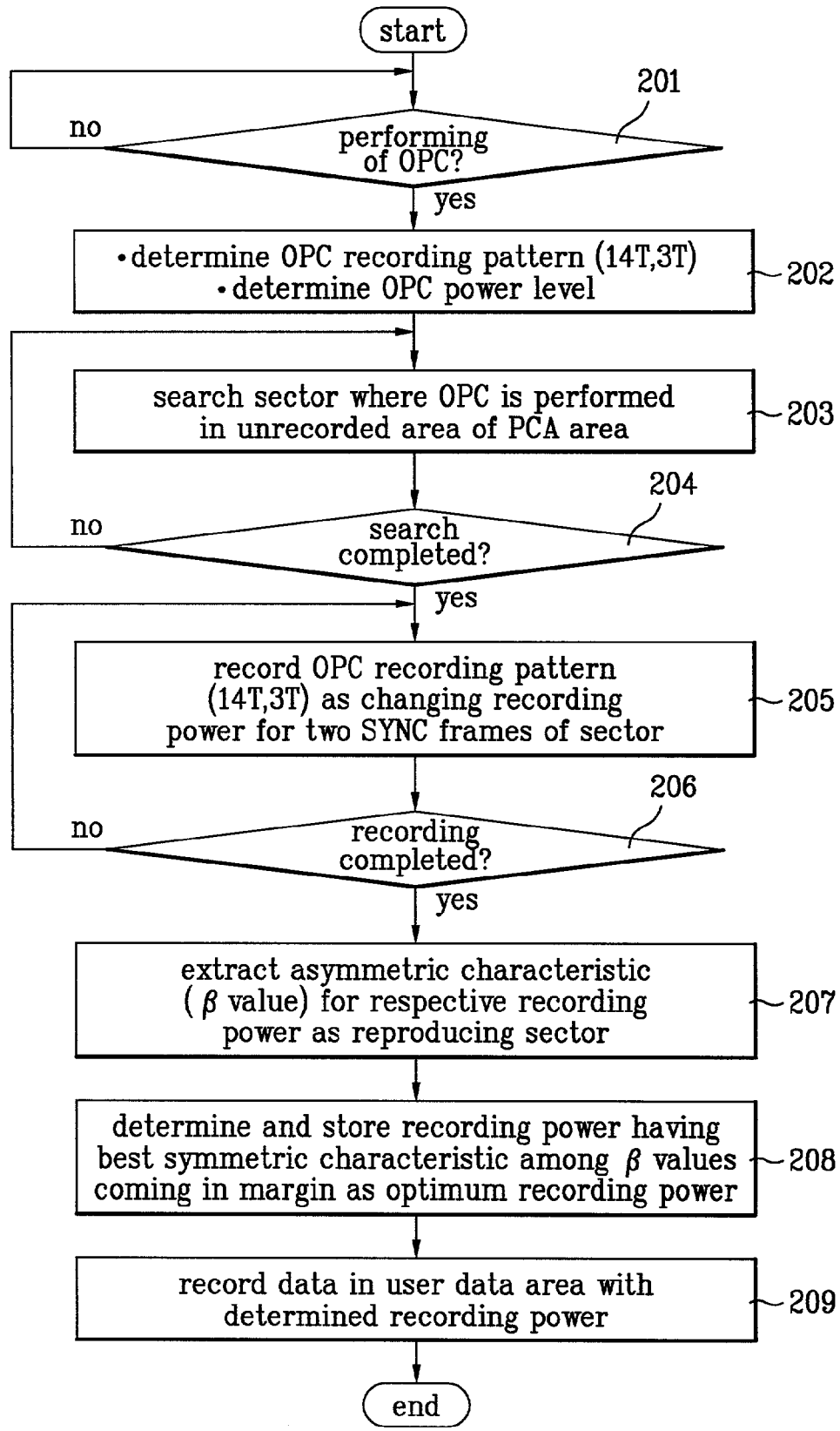
FIG. 9 is a flowchart illustrating the process of determining the optimum recording power by the asymmetric characteristic in the optical recording/reproducing apparatus of FIG. 8 according to the present invention.
Figure 11:
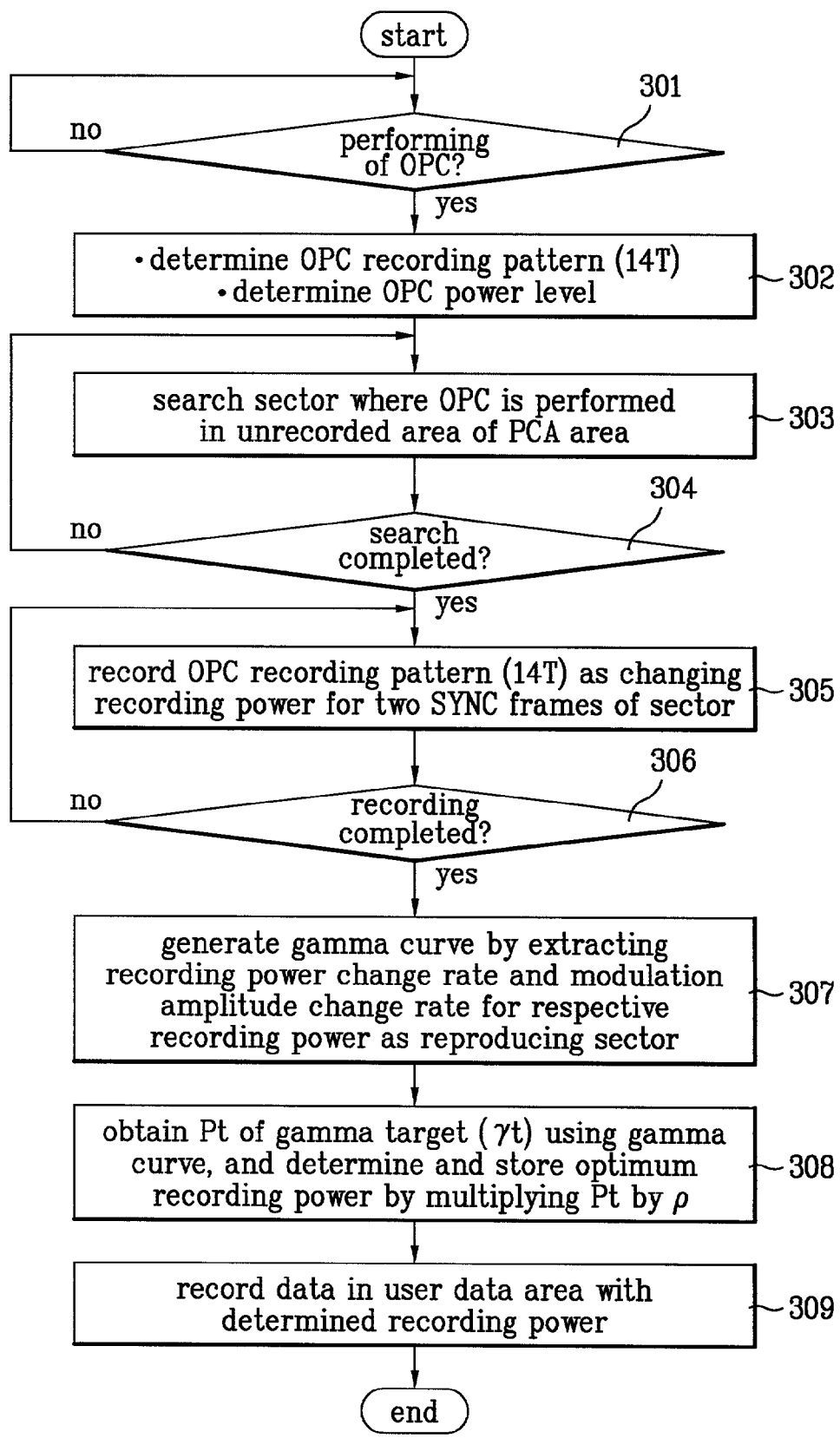
FIG. 11 is a flowchart illustrating the process of determining the optimum recording power by the modulation amplitude characteristic in the optical recording/reproducing apparatus of FIG. 8.

FIG. 9 is a flowchart illustrating the process of generating the optimum recording power by the asymmetric method, and FIG. 11 is a flowchart illustrating the process of generating the optimum recording power by the modulation amplitude method. The optical disc recording/reproducing apparatus of FIG. 8 is applied to the both methods.

Asymmetric Method

If the DVD-R/RW is inserted or the data to be recorded is inputted, the OPC control section 106 judges to perform the OPC (step 201). At this time, the encoding section 105 generates 14T and 3T under the control of the OPC control section 106, and outputs them to the LD driving section 108 through the recording pattern generating section 105-3. Also, the OPC control section 106 read the standard power recommended by disc makers from the ATIP information of the lead-in area, divides the recording power by 13 levels on the basis of the recording power, and then sequentially outputs the recording power of the respective levels to the laser power control section 107. The laser power control section 107 outputs the recording power of the corresponding sync frame to the LD driving section 108 under the control of the OPC control section 106 (step 202).

Also, the sector where the OPC is performed in an unrecorded area of the PCA is searched (step 203). At this time, the search of the sector can be performed from the inner periphery to the outer periphery and vice versa. In case of sequentially performing the OPC from the innermost periphery to the outermost periphery, it is advantageous to perform the recording from the low power to the high power in order to mark the sector where the OPC is performed. However, in case of sequentially performing the OPC from the outer periphery to the inner periphery of the PCA area in the same manner as the existing CD, it is advantageous to perform the recording from the high power to the low power in order to mark the sector where the OPC is performed.

To do so, the area where the recording pattern is recorded and the unrecorded area can be accurately discriminated from each other during performing the OPC.

At step 203, if the search for the sector where the OPC is to be performed is completed (step 204), the OPC is performed in the sector.

Specifically, the LD driving section 108 records 14T and 3T with the recording power of 13 levels for one sector searched at the above step by changing the recording power for every two sync frames (step 205). Here, 14T and 3T are recorded with the same recording power. Specifically, pits and blanks of 14T are recorded for one sync frame of the two sync frames recorded with the same recording power, and then pits and blanks of 3T are recorded for the other sync frame. That is, 14T and 3T are recorded in the searched sector from the recording power of the first level, and the recording operation is sequentially repeated with 13 recording power levels.

Figure 10A:
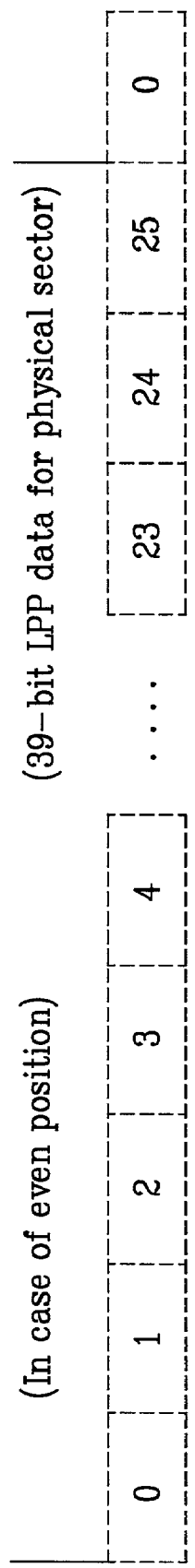
FIGS. 10A to 10D are views illustrating examples of recording of the OPC data and determination of the optical recording power according to the flowchart of FIG. 9.
Figure 10B:
Figure 10C:
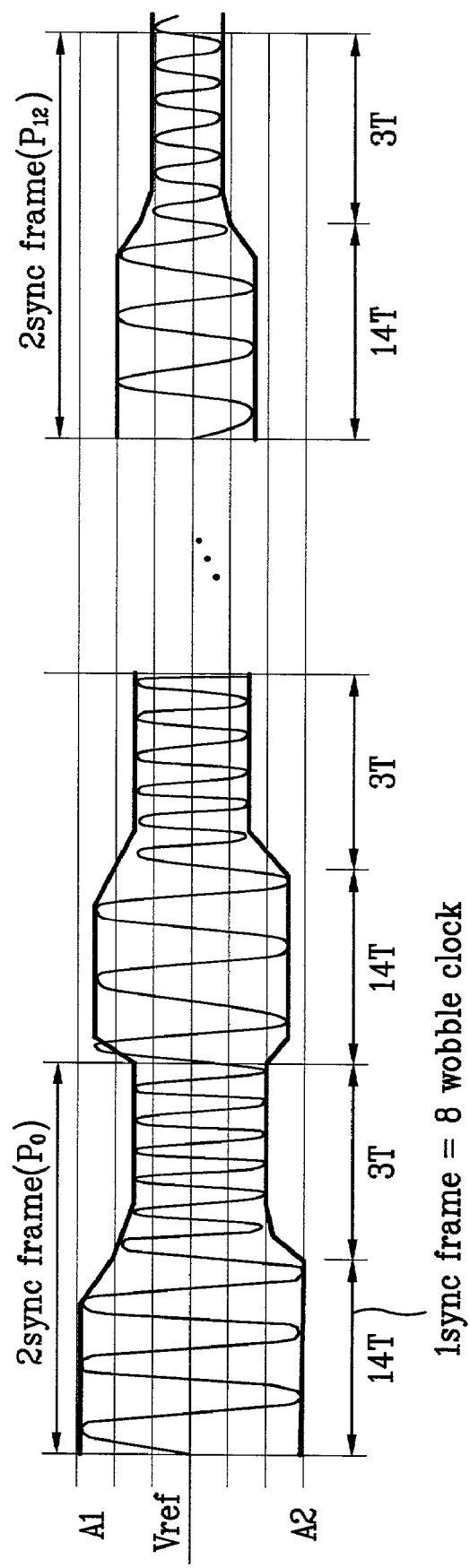

FIGS. 10A to 10D are views illustrating examples of performing of the OPC in the even sector through the asymmetric method. In detail, FIGS. 10A and 10B show examples of recording of the LPP data in the even sync frames of the even sector, and FIG. 10C shows an example of recording of 14T and 3T for one sector with 13 recording power levels as changing the recording power for every two sync frames.

As shown in FIG. 10C, for one recording power, 14T that is the longest T is recorded for one sync frame, and then 3T that is the shortest T is recorded for the other sync frame. This process is repeated 13 times for one sector.

Thereafter, if it is judged that the recording is completed (step 206), the asymmetric characteristic, i.e., the β value ($\beta=(A1+A2-2Vref)/(A1-A2)$) is obtained for the respective recording power as the physical sector where 14T and 3T are recorded with 13 recording power levels is reproduced (step 207). At this time, the β value is obtained for 14T and 3T, respectively.

Specifically, the RF signal generating section 101 generates the RF signal using the electric signals of the light quantity reflected from the physical sector, and outputs the RF signal to the RF signal processing section 102. At this time, the RF signal processing section 102 outputs the inputted RF signal to the switching section 102-3 through two paths. One path is for directly bypassing the RF signal to the switching section 102-3, and the other path is for outputting the AC-coupled and biased RF signal to the switching section 102-3.

At this time, as it is assumed that the optimum recording power selecting method is the asymmetric method, the switching section 102-3 selects the AC-coupled and biased RF signal under the control of the OPC control section 106, and outputs the AC-coupled and biased RF signal to the RF envelop detecting section 103.

The RF envelop detecting section 103 detects the peak envelop A1 and the bottom envelop A2 of the AC-coupled and biased RF signal, and outputs the detected peak envelop and the bottom envelop to the OPC control section 106.

The OPC control section 106 converts the inputted peak envelop and the bottom envelop into digital signals, and obtains the β value from the digital peak envelop and the bottom envelop.

Specifically, the OPC control section 106 obtains the β values for all 13 recording power levels, and obtains the β values of 14T and 3T for one recording power level.

At this time, the asymmetric method detects how much the RF signal is shifted from the reference voltage Vref, and thus the β value can be obtained by the following equation 3.

$$\beta=|\{(A1-Vref)-(Vref-A2)\}/(A1-A2)|=|(A1+A2-2Vref)/(A1-A2)| \quad \text{[Equation 3]}$$

Then, the optimum recording power is determined using the β value, and then stored (step 208). That is, the recording power having the minimum characteristic within the margin is determined as the optimum recording power.

At this time, the β margin area is checked with respect to 14T and 3T. For example, if the β value is within 4%, the corresponding recording power is determined to be the optimum recording power. If several β values exist in 4%, the recording power having the smallest β value among the β values is determined to be the optimum recording power. For example, if the β value of 3T recorded with the second recording power among the 13 recording power levels is the smallest value, the second recording power is determined to be the optimum recording power. Thereafter, the data is recorded in the user data area with the optimum recording power determined at the above step (step 209).

As an example, in case of the DVD-R, the OPC according to the asymmetric method can be used. In this case, The OPC control section 106 searches the unrecorded area (i.e., sector) among the PCA area of the disc, and if the desired sector is searched, the recording is performed in the sector according to the asymmetric algorithm. According to the present invention, 14T and 3T are recorded while the recording power is changed for every two sync frames. At this time, the recorded power or the applied write strategy map is stored according to the stage of changing the recording power level. At this time, the unrecorded sector area among the PCA area can be detected using the RF signal. This is because the level of the RF signal differs from one another according to the recorded/unrecorded state of the data.

Next, as the physical sector where 14T and 3T are recorded with the 13 recording power levels, the generated RF signal is AC-coupled, and then the peak envelope and the bottom envelope of the AC-coupled RF signal are detected. Then, the recording power or the write strategy having the most suitable asymmetry with respect to the reference voltage Vref is determined to be the optimum recording power as the result of the OPC, and the optimum recording power is used for the actual recording of the data in the data area.

Figure 10D:
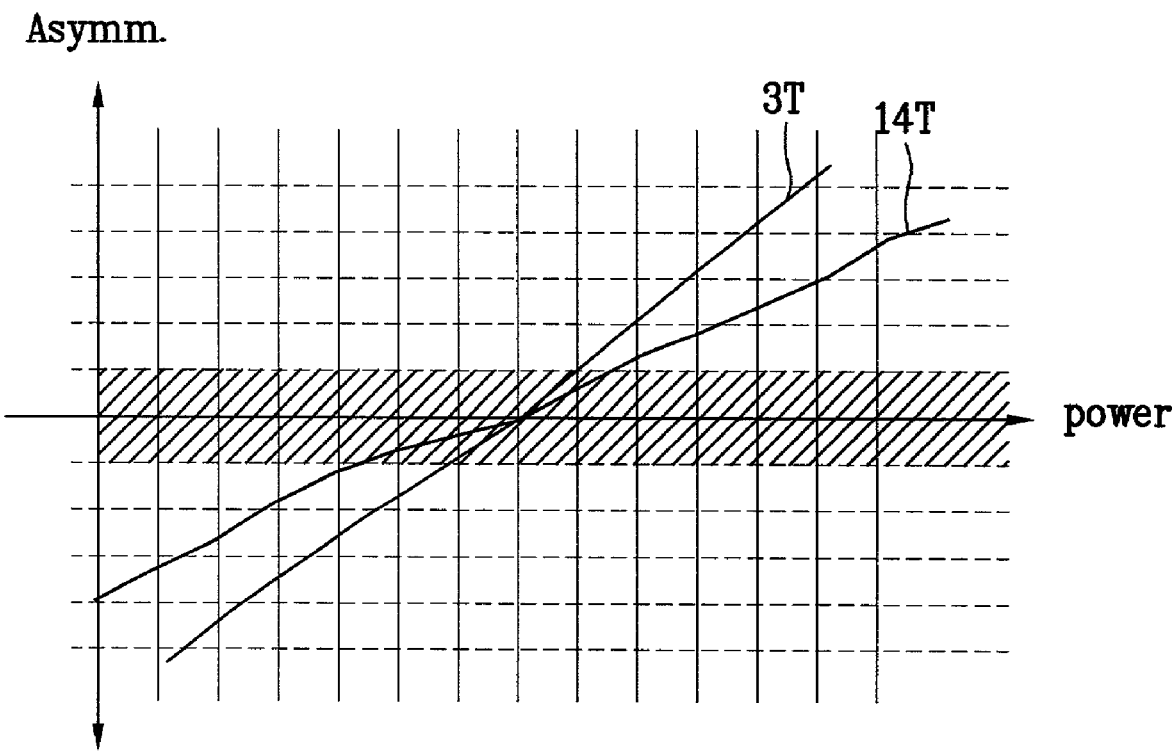

FIG. 10D is a graph illustrating an example of selection of the optimum recording power using the asymmetric characteristic. In FIG. 10D, it is assumed that the hatched portion represents the margin for the β value. At this time, it can be recognized that the asymmetric characteristic curve of 14T is slow, and the curve of 3T is steep in comparison to 14T. This is the reason why 14T and 3T, i.e., the longest T and the shortest T, are used as the recording pattern in the asymmetric method.

Specifically, 3T has the greatest change of the asymmetric characteristic with respect to the change of the recording power, and 14T has the smallest change of the asymmetric characteristic. This is because the asymmetric method is for checking how the recording pattern having the greatest asymmetric change, for example, 3T, is changed with respect to the recording pattern having the smallest asymmetric change, for example, 14T.

At this time, the OPC for searching the unrecorded sector area in the PCA can be performed from the inner periphery to the outer periphery and vice versa. If the OPC is sequentially performed from the innermost periphery to the outermost periphery, it is advantageous to perform the recording from the low power to the high power in order to mark the sector where the OPC was performed. However, in case that the OPC is sequentially performed from the outer periphery to the inner periphery of the PCA area as in the existing CD, it is advantageous to perform the recording from the high power to the low power in order to mark the sector where the OPC was performed.

To do so, the area where the recording pattern is recorded and the unrecorded area can be accurately discriminated during the OPC operation.

Modulation Amplitude Method

Meanwhile, when the optimum recording power is determined by the modulation amplitude method according to the present invention, the OPC is performed in the unit of a sector as shown in FIG. 11. That is, the OPC is performed once for on sector.

In the same manner, according to the modulation amplitude method, the predetermined recording pattern is recorded in the unrecorded sector of the test area with the 13 recording power levels for one sector. That is, the predetermined recording pattern can be recorded as the recording power is changed for every two sync frames. In the embodiment, the recording pattern at this time is 14T. This is only an embodiment, and the recording pattern may be changed according to the designer.

Also, as another embodiment, the predetermined recording pattern may be recorded as the recording power is changed for every sync frame. At this time, the corresponding recording pattern is recorded with 26 recording power levels for one sector.

Specifically, if it is judged that the OPC was performed (step 301), the encoding section 105 generates 14T under the control of the OPC control section 106, and outputs 14T to the LD driving section 108 through the recording pattern generating section 105-3. The laser power control section 107 outputs the recording power of the corresponding sync frame to the LD driving section 108 under the control of the OPC control section 106 (step 302). Also, the sector where the OPC is to be performed in the unrecorded area of the PCA is searched (step 303). If the search for the sector where the OPC is to be performed is completed (step 304), the OPC is performed in the sector using the modulation amplitude method.

Specifically, the LD driving section 108 records 14T with the recording power of 13 levels for one sector searched at the above step by changing the recording power for every two sync frames (step 305). Here, 14T is recorded with the same recording power in the respective pit and blank for every two sync frames.

Figure 12A:
Figure 12C:
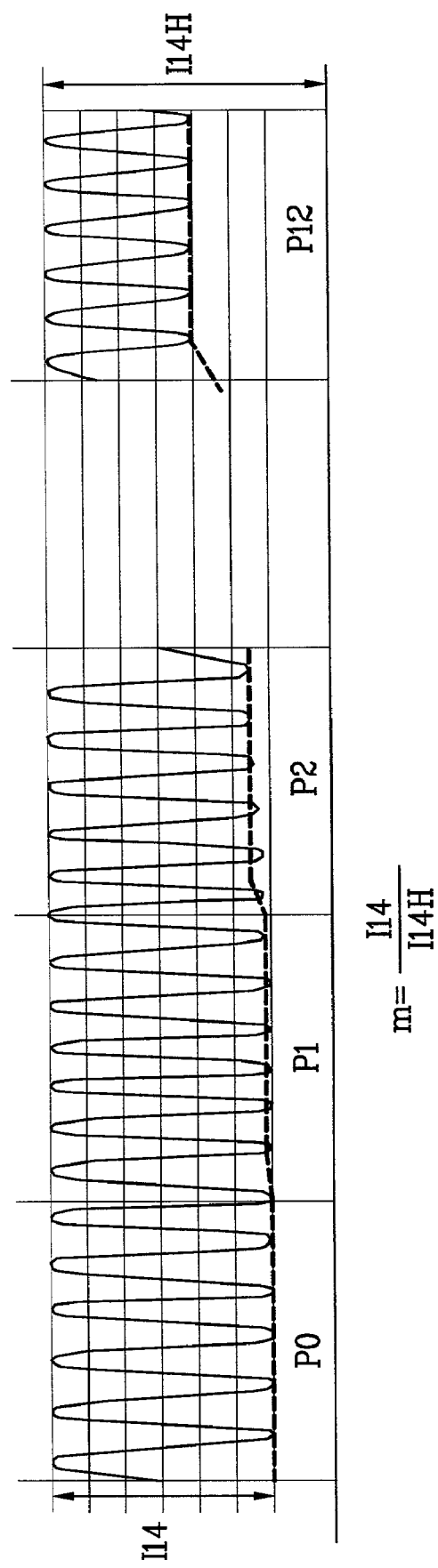

FIGS. 12A to 12D are views illustrating examples of performing of the OPC in the even sector through the modulation amplitude method. In detail, FIGS. 12A and 12B show examples of recording of the LPP data in the even sync frames of the even sector, and FIG. 12C shows an example of recording of 14T with 13 recording power levels as changing the recording power for every two sync frames.

As shown in FIG. 12C, for one recording power, 14T that is the longest T is recorded for two sync frames, and this process is repeated 13 times for one sector.

Thereafter, if it is judged that the recording is completed (step 306), the gamma curve is generated by detecting the change rate of the modulation amplitude and the change rate of the recording power for respective recording power as reproducing the physical sector where 14T is recorded with the 13 recording power levels (step 307).

Specifically, the RF signal generating section 101 generates the RF signal using the electric signals of the light quantity reflected from the physical sector, and outputs the RF signal to the RF signal processing section 102. At this time, the RF signal processing section 102 directly bypasses the RF signal to the switching section 102-3, or outputs the AC-coupled and biased RF signal to the switching section 102-3.

At this time, as it is assumed that the optimum recording power selecting method is the modulation amplitude method, the switching section 102-3 selects the bypassed RF signal under the control of the OPC control section 106, and outputs the bypassed RF signal to the RF envelop detecting section 103.

The RF envelop detecting section 103 detects the peak envelop and the bottom envelop of the bypassed RF signal, and outputs the detected peak envelop and the bottom envelop to the OPC control section 106.

The OPC control section 106 converts the inputted peak envelop and the bottom envelop into digital signals, and obtains the change rate of the recording power and the change rate of the modulation amplitude for 14T from the digital peak envelop and the bottom envelop by applying the equations 1 and 2.

At this time, since it is assumed that the recording pattern is 14T, the modulation amplitude characteristic for 14T (m=I14/I14H) is obtained for the respective recording power. Here, the changed amount of the recording power is deemed to be constant value (dP=K).

The below table 1 shows the modulation amplitude, change amount of the modulation amplitude, change amount of the recording power, and gamma ($\gamma$) value detected for 13 recording power levels for one sector.

TABLE 1

| Pt | P0 | P1 | P2 | Pn | ... | P12 |
|---|---|---|---|---|---|---|
| m | M0 | m1 | m2 | mn | ... | m12 |
| dm/dp | 0 | (m1−m0)/K | (m2−m1)/K | ... | | (m12−m11)/K |
| P/m | P0/m0 | P1/m1 | P2/m2 | Pn/mn | | P12/m12 |
| $\gamma$ | $\gamma$ 0 | $\gamma$ 1 | $\gamma$ 2 | $\Gamma$n | ... | $\gamma$ 12 |

Figure 12D:
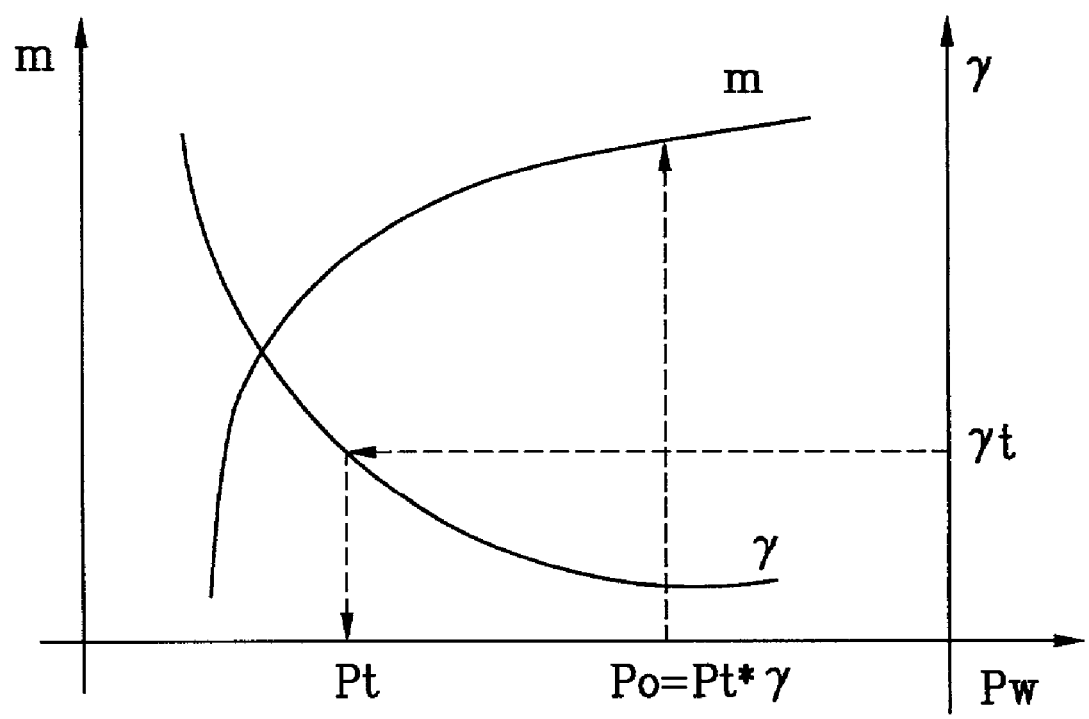

Thereafter, the optimum recording power is searched and stored using the modulation amplitude curve and the gamma ($\gamma$) curve as shown in FIG. 12D (step 308). Here, the gamma ($\gamma$) curve is a slope obtained by normalizing the function m(Pw), and expressed by the change amount of the modulation amplitude and the change amount of the recording power as in equation 2. Pw is the recording power recorded in the test area.

At this time, the optimum recording power (Po) is determined by multiplying the recording power (Pt) corresponding to the predetermined gamma target ($\gamma_t$) value in the gamma curve by the multiplication factor ($\rho$). Here, the gamma target ($\gamma_t$) value and the multiplication factor ($\rho$) are predetermined during the manufacture of the disc, and encoded with the special information of the ATIP in the lead-in area. They may be differently determined according to the kind of disc and the maker.

The data is recorded in the user data area with the optimum recording power obtained as above (step 309).

At this time, in the same manner as the asymmetric method, the process of searching the sector where the OPC is to be performed according to the modulation amplitude method may be performed from the inner periphery to the outer periphery and vice versa. In case that the OPC is sequentially performed from the innermost periphery to the outermost periphery, it is advantageous to perform the recording from the low power to the high power in order to mark the sector where the OPC was performed. However, in case that the OPC is sequentially performed from the outer periphery to the inner periphery of the PCA area as in the existing CD, it is advantageous to perform the recording from the high power to the low power in order to mark the sector where the OPC was performed.

Second Embodiment

Meanwhile, according to the second embodiment of the present invention, another method for selecting the optical recording power that applies the above-described asymmetric method has bee proposed as shown in FIGS. 13, 14, and 15A to 15E. In the same manner as the first embodiment, according to the method according to the second embodiment, the start position of the even sector and the start position of the odd sector are detected by performing the sector synchronization.

Figure 13:
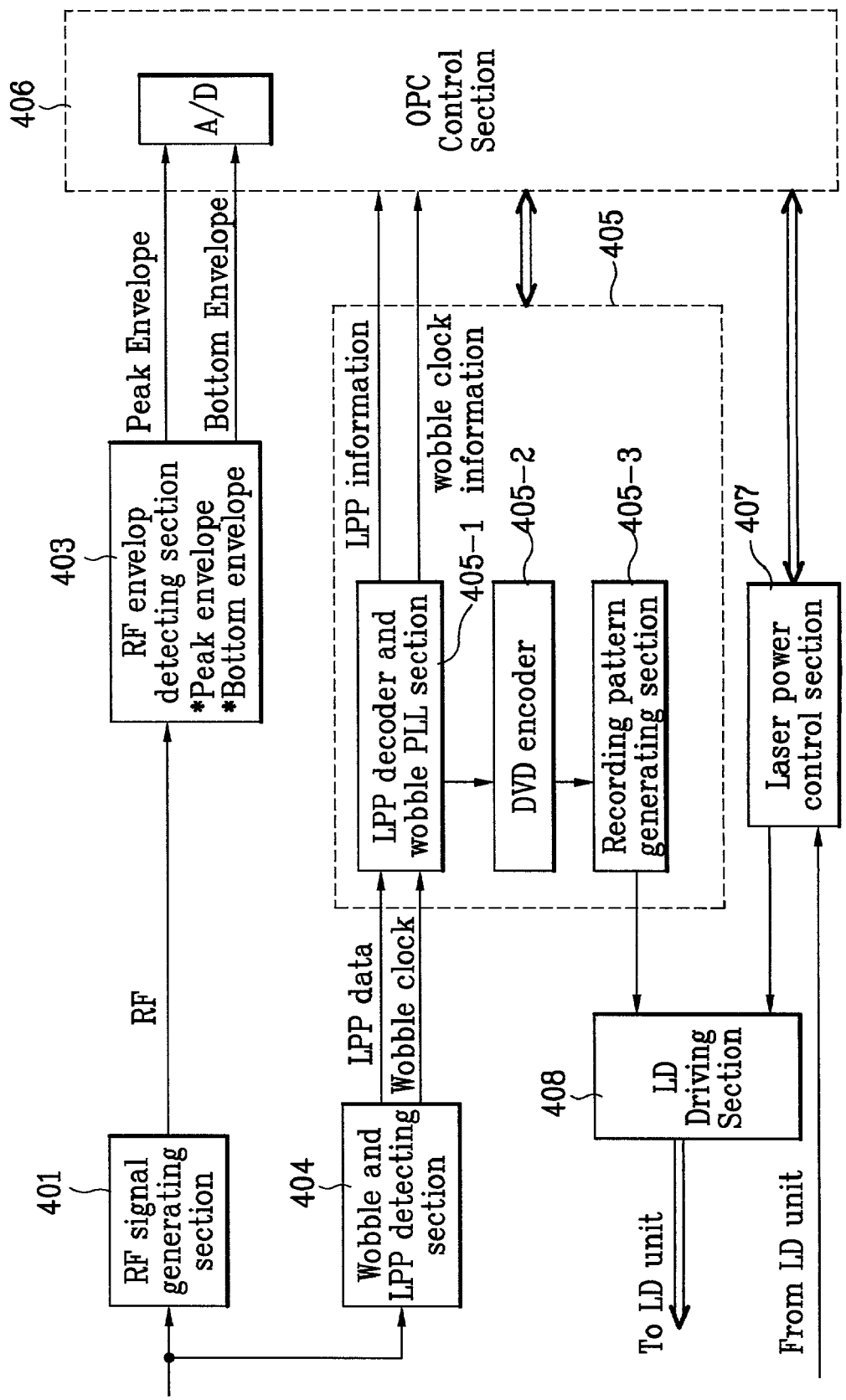
FIG. 13 is a block diagram illustrating the construction for determining the optimum recording power in an optical recording/reproducing apparatus according to a second embodiment of the present invention.
Figure 14:
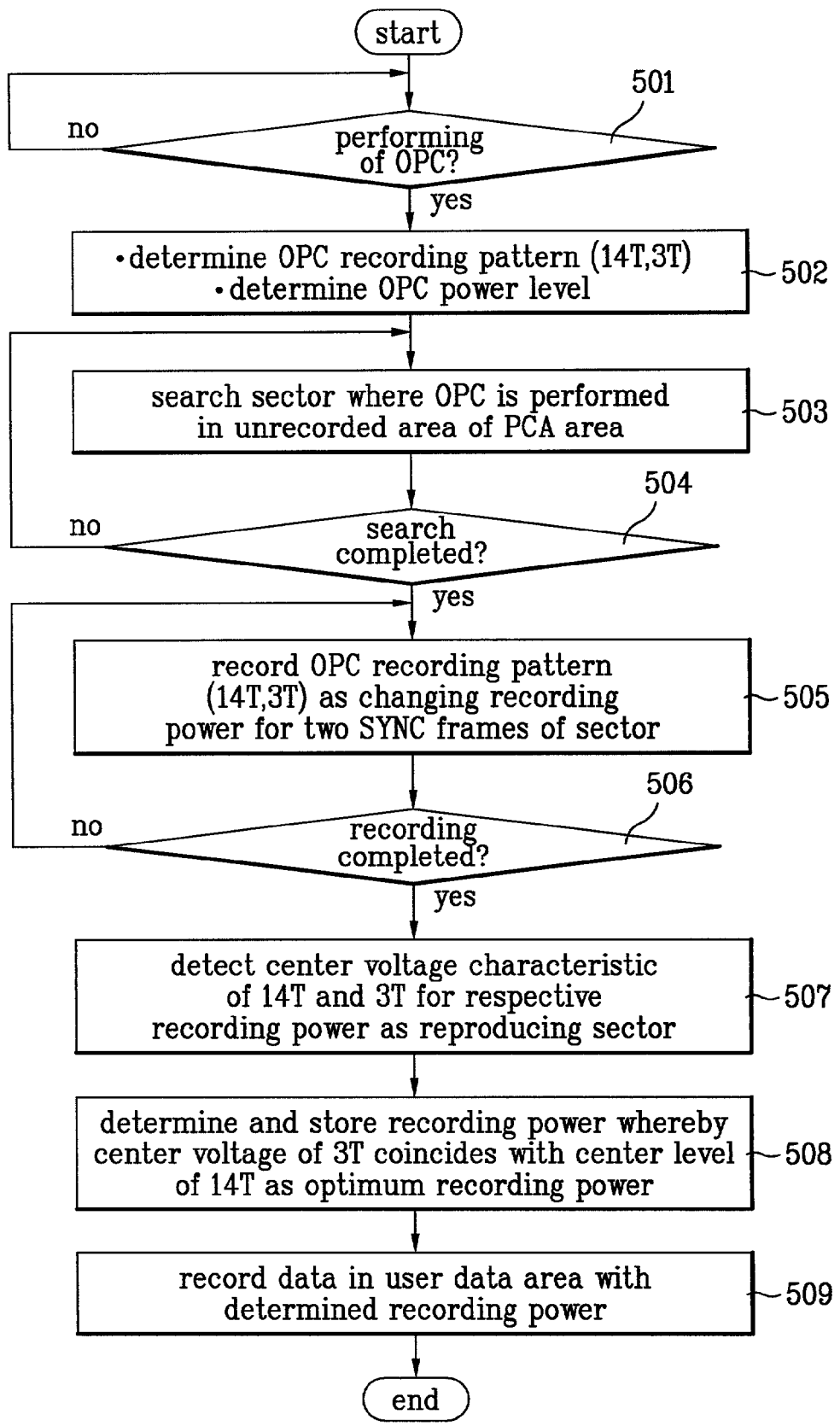
FIG. 14 is a flowchart illustrating the process of determining the optimum recording power by center voltages of the longest T and the shortest T in the optical recording/reproducing apparatus of FIG. 13 according to the present invention.

FIG. 13 is a block diagram illustrating the construction for selecting the optimum recording power in the optical disc recording/reproducing apparatus according to the second embodiment of the present invention. The construction of FIG. 13 includes no RF signal processing section, and this is different from that of FIG. 8. FIG. 14 is a flowchart illustrating the operation at this time, and FIGS. 15A to 15E illustrate the process of performing the OPC using the flowchart of FIG. 14.

That is, the RF signal generated in the RF signal generating section 401 is directly bypassed to the RF envelop detecting section 403, and the RF envelop detecting section 403 obtains the peak envelop and the bottom envelop of the inputted RF signal to output them to the OPC control section 406.

In the same manner as above, the OPC is performed once for one sector, and the recording power is changed to 13 levels. 14T and 3T are determined as the recording pattern recorded with respective recording power levels for the same reason as the asymmetric method. Specifically, the recording power is changed for every two sync frames as shown in FIG. 15D, and the recording power is changed to 13 levels for one sector. At this time, pits and blanks of 14T are recorded in one sync frame with the same recording power, and then the pits and blanks of 3T are recorded in the next sync frame.

However, unlike the above-described asymmetric method, the signal reproduced from the physical sector is not AC-coupled and biased with the reference voltage, but is directly outputted to the RF envelop detecting section 403.

Specifically, if it is judged that the OPC was performed (step 501), the encoding section 405 generates 14T and 3T under the control of the OPC control section 406, and outputs them to the LD driving section 408 through the recording pattern generating section 405-3. The laser power control section 407 outputs the recording power of the corresponding sync frame to the LD driving section 408 under the control of the OPC control section 406 (step 502).

Also, the sector where the OPC is to be performed in the unrecorded area of the PCA is searched (step 503). At this time, the search of the sector may be performed from the inner periphery to the outer periphery and vice versa. If the search for the sector where the OPC is to be performed is completed (step 504), the OPC is performed in the sector.

Specifically, the LD driving section 408 records 14T and 3T with the recording power of 13 levels for one sector searched at the above step by changing the recording power for every two sync frames (step 505).

Here, 14T and 3T are recorded with the same recording power. That is, the pits and blanks of 14T are recorded for one sync frame of the two sync frames recorded with the same recording power, and then the pits and blanks of 3T are recorded for the other sync frame.

Figure 15A:
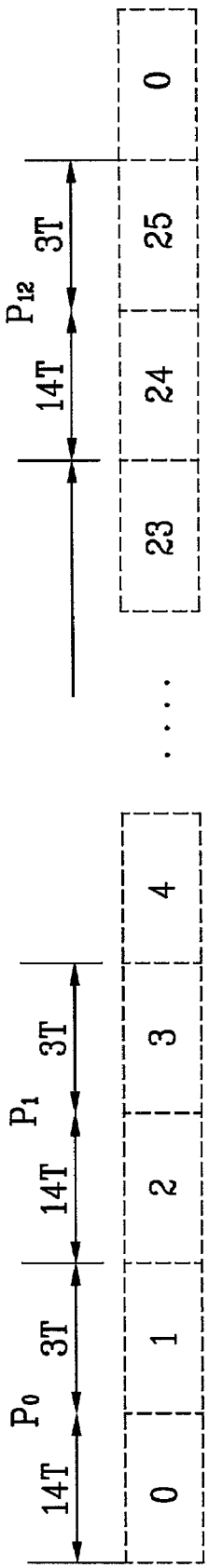
FIGS. 15A to 15E are views illustrating examples of recording of the OPC data and determination of the optical recording power according to the flowchart of FIG. 14.
Figure 15B:
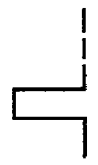
Figure 15B:
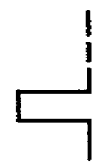
Figure 15B:
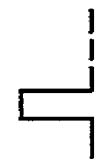
Figure 15B:
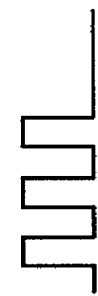
Figure 15C:
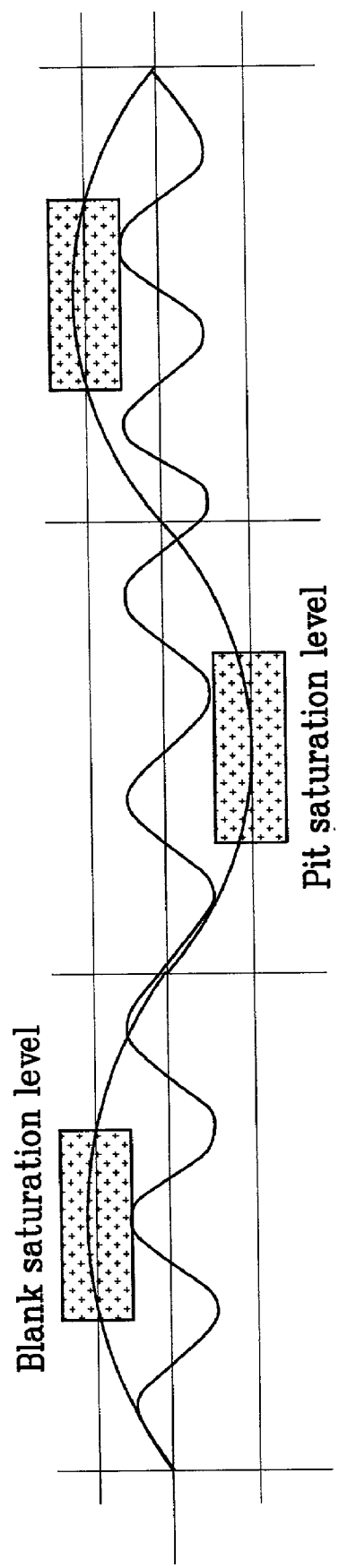
Figure 15D:
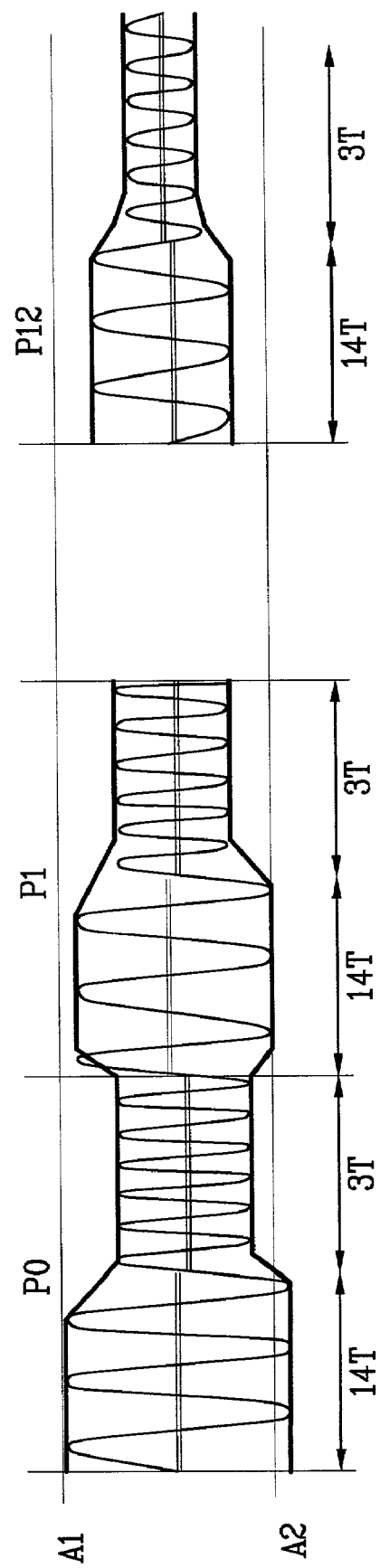
Figure 15E:
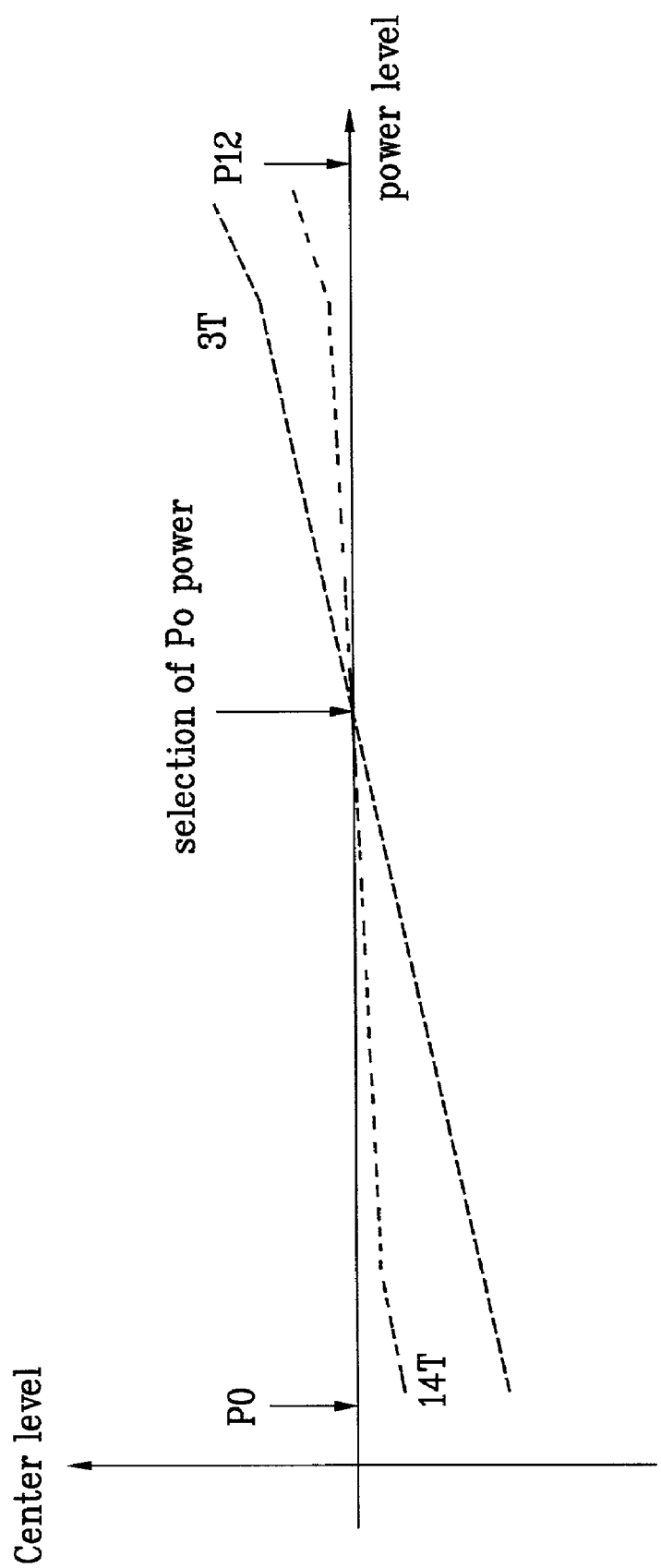

FIGS. 15A to 15E are views illustrating examples of performing of the OPC in the even sector through the method according to the second embodiment of the present invention. In detail, FIGS. 15A and 15B show examples of recording of the LPP data in the even sync frames of the even sector, and FIG. 15C is a graph showing the center voltage when 14T is saturated, and the relation with the center level of 3T at that time. FIG. 15D shows an example of recording of 14T and 3T with 13 recording power levels as changing the recording power for every two sync frames. FIG. 15E is a graph illustrating the optimum recording power determination at that time.

As shown in FIG. 15D, for one recording power, 14T that is the longest T is recorded for one sync frame, and then 3T that is the shortest T is recorded for the next sync frame. This process is repeated 13 times for one sector.

Thereafter, if it is judged that the recording is completed (step 506), the center voltage of 14T and the center voltage of 3T are obtained for the respective recording power as the physical sector where 14T and 3T are recorded with the 13 recording power levels is reproduced (step 507).

Specifically, the OPC control section 406 converts the peak envelop and the bottom envelop of the RF signal into digital signals, and detects the center voltages of 14T and 3T for the respective recording power from the digital peak envelop and bottom envelop.

At this time, the center voltage in 14T has the saturation characteristic as shown in FIG. 15C, but the center voltage in 3T cannot have the saturation characteristic.

Here, the saturation characteristic means that if the recording power reaches a certain level, the level of the RF signal does not change any more even when the recording power is heightened or lowered as shown in FIG. 15C. At this time, in case of the blank, the level up to the maximum reflected amount is the blank saturation level, while in case of the pit, the level to the minimum reflected amount is the pit saturation level.

Specifically, in the long T (for example, 14T) recorded with a proper recording power, there exists an area where the blank or pit saturation level does not change, and there exists a portion where the center voltage of the short T (for example, 3T) that is sensitive to the recording power coincides with the center level of the long T (for example, 14T) in that area. The recording power of this portion is determined and stored as the optimum recording power as shown in FIG. 15E (step 508).

That is because if the center level in the saturation area of 14T is equal to the center level of 3T, the recording pattern is recorded with the optimum recording power. Accordingly, the recording power at that time is determined as the optimum recording power. FIG. 15E is a graph showing the center level change with respect to 14T and 3T. In FIG. 15E, the recording power within the range where the center level of 14T is similar to the center level of 3T is determined to be the optimum recording power.

Thereafter, the data is recorded in the user data area with the optimum recording power determined as above (step 509).

In the second embodiment of the present invention, the process of searching the sector where the OPC is to be performed according to the modulation amplitude method may be performed from the inner periphery to the outer periphery and vice versa. In case that the OPC is sequentially performed from the innermost periphery to the outermost periphery, it is advantageous to perform the recording from the low power to the high power in order to mark the sector where the OPC was performed. However, in case that the OPC is sequentially performed from the outer periphery to the inner periphery of the PCA area as in the existing CD, it is advantageous to perform the recording from the high power to the low power in order to mark the sector where the OPC was performed.

Third Embodiment

Figure 16:
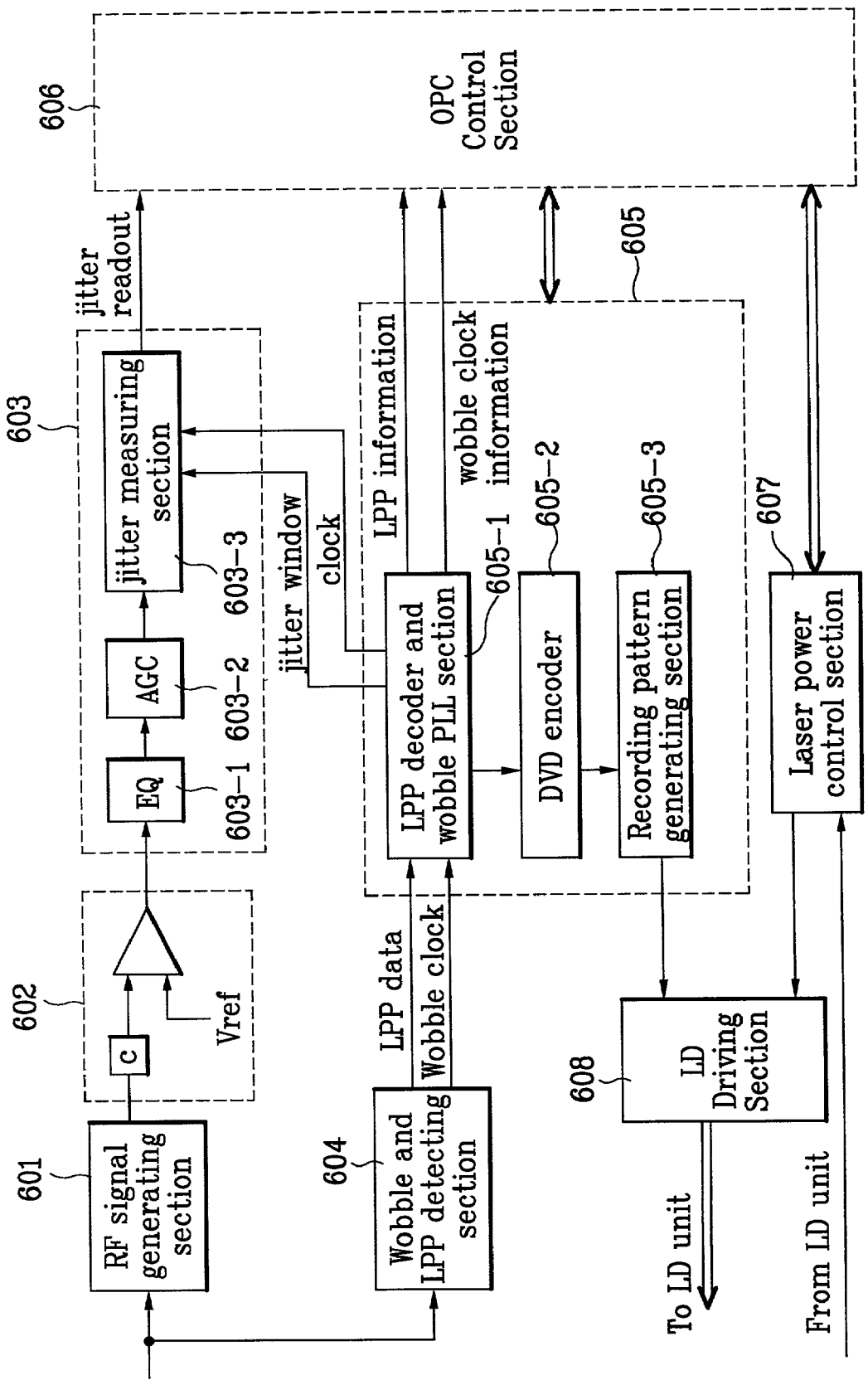
FIG. 16 is a block diagram illustrating the construction for determining the optimum recording power in the optical recording/reproducing apparatus according to a third embodiment of the present invention.

FIG. 16 is a block diagram illustrating the construction of the optical disc recording/reproducing apparatus according to the third embodiment of the present invention. In FIG. 16, OPC-related blocks are illustrated.

Referring to FIG. 16, the apparatus for generating an optimum recording power for an optical recording medium according to the present invention includes an RF signal generating section 601 for generating an RF signal by combining electric signals of reflected light quantity outputted from an optical pickup (not illustrated), an RF signal processing section 602 for AC-coupling and biasing with a reference voltage Vref the RF signal, a jitter detecting section 603 for detecting a jitter from the AC-coupled and biased RF signal, a wobble and LPP detecting section 604 for generating a push-pull signal by combining electric signals corresponding to a reflected light quantity outputted from the optical pickup, and detecting a wobble clock and LPP data from the push-pull signal, an encoding section 605 for decoding the LPP data by PLL-locking the wobble clock of the wobble and LPP detecting section 604, generating a recording pattern to be recorded on the disc, and outputting a jitter window signal to the jitter detecting section 603, an OPC control section 606 for receiving the jitter detected by the jitter detecting section 603, controlling the OPC, and determining an optimum recording power, a laser power control section 607 for generating a recording power under the control of the OPC control section 606, and a laser diode (LD) driving section 608 for recording the recording pattern outputted from the encoding section 605 with the recording power provided from the laser power control section 607.

Figure 17:
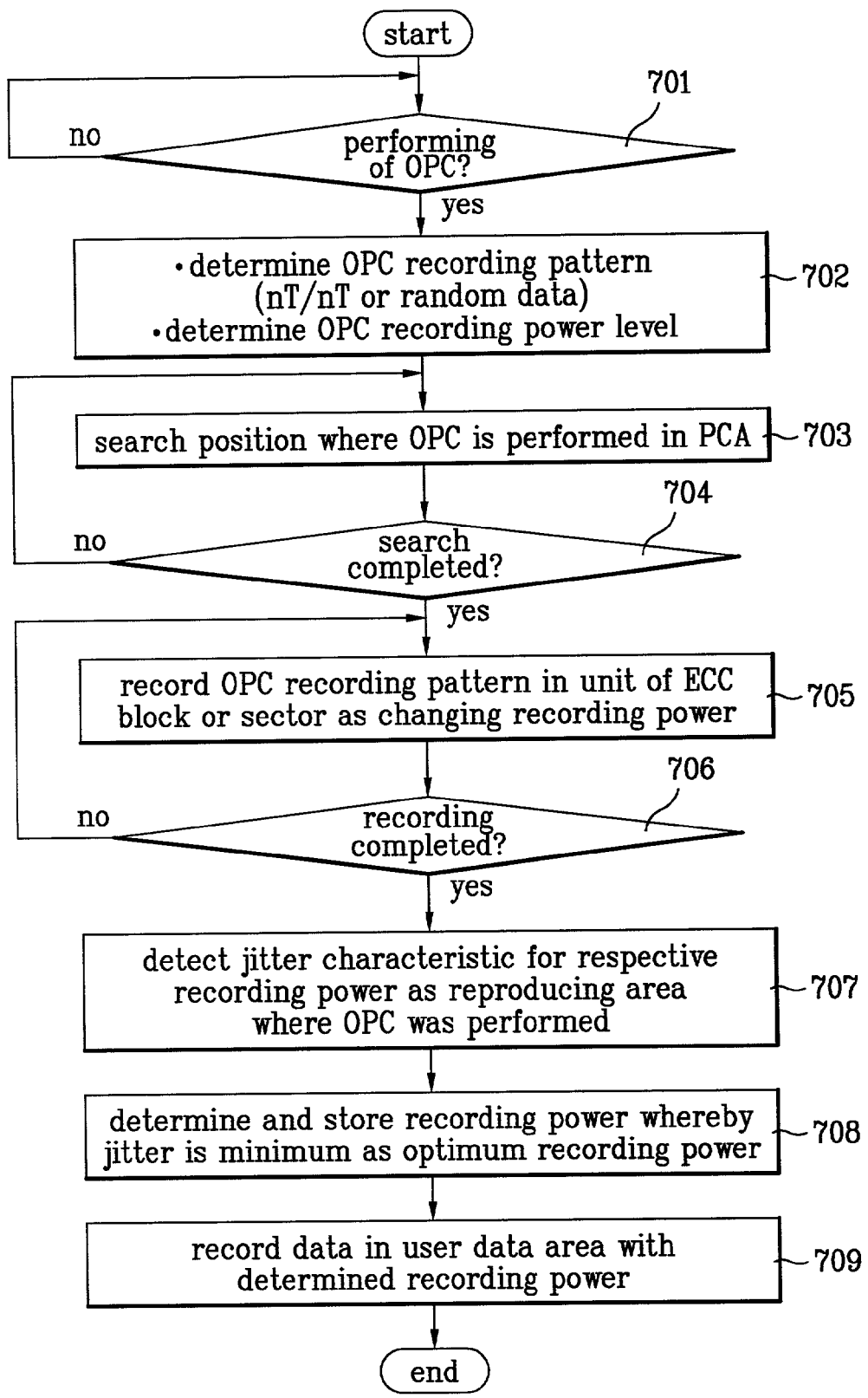
FIG. 17 is a flowchart illustrating the process of determining the optical recording power using the jitter characteristic in the optical recording/reproducing apparatus of FIG. 16.

FIG. 17 is a flowchart illustrating the operation of the OPC control section 606 for generating the optimum recording power according to the present invention. The OPC control section 606 controls the OPC so that the recording is performed with the optimum recording power during the recording of the user data. In order to detect the optimum recording power from a certain recorded pattern, the jitter is obtained for the respective recording power applied during the recording, and the jitter for the respective recording power is stored in the storage area. Thereafter, the optimum recording power is determined by comparing the jitter amount for the respective recording power.

Especially, when the recording for the OPC is performed, the recording pattern and the recording power level are planned, and the recording is performed in the test area of the PCA of the disc according to the plan.

In the third embodiment of the present invention as constructed above, the OPC may be performed in the unit of an ECC block (=16 sectors) or in the unit of a sector under the control of the OPC control section 606.

At this time, in case that the OPC is performed in the unit of one ECC block, the statistical degree of jitter can be heightened. Also, in case that the OPC is performed in the unit of a sector, the limitation of the PCA in that the recording is impossible due to a full state of the test area even if any recordable area remains can be overcome.

First, the jitter means the change of the length function with respect to the same T in analog, and means the phase difference with respect to the same T in digital.

Figure 18A:
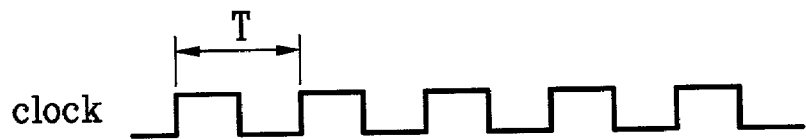
FIG. 18A to 18C are waveform diagrams illustrating the detected general jitter.
Figure 18B:
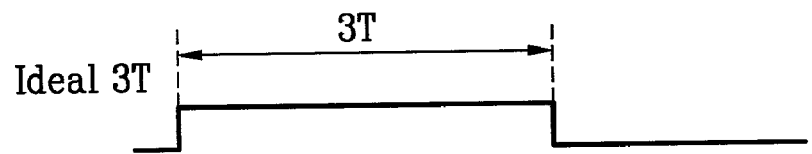
Figure 18C:
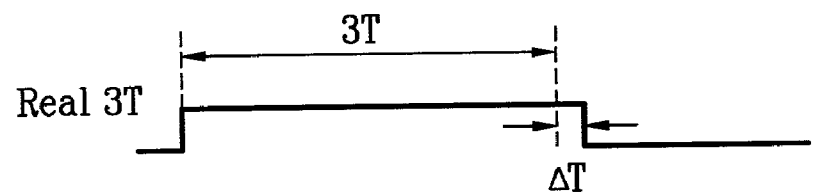

FIGS. 18A to 18C show examples of a general jitter detecting method. This method obtains the jitter by the following equation 3.

$$\sigma = \{\Sigma(3T-(3T+\Delta T))^2\}^{1/2}/N$$

$$\text{jitter } (\%) = \sigma/T \times 100 \quad \text{[Equation 3]}$$

If the OPC is performed in the unit of an ECC block, the recording power becomes different for each sector, and the data inputted with the same recording power is recorded in the respective sector. That is, during performing the OPC once, the input data is recorded with the 16 recording power levels for an ECC block of the test area of the corresponding PCA.

Meanwhile, if the OPC is performed in the unit of a sector, the data inputted with various recording power levels is recorded for a sector. That is, the OPC is performed once for one sector, and at this time, the input data is recorded as the recording power is changed to various levels for the corresponding sector. Here, a sector is composed of 26 sync frames, and if the OPC is performed with 13 recording power levels during performing the OPC in the unit of a sector, the recording power is changed for every two sync frames.

Also, the recording pattern can be recorded as random data or a single recording pattern of nT/nT. Especially, in case of performing the OPC in the unit of an ECC block, the random data or the single recording pattern of nT/nT is determined. In case of performing the OPC in the unit of a sector, nT/nT is determined. At this time, when the single recording pattern of nT/nT is determined as the OPC recording pattern, a short T such as 3T or 4T is determined. This is for securing the number of samples during measuring the jitter of nT.

Also, in case of performing the OPC in the unit of a sector, the sector synchronization is performed in the same manner as in the first embodiment to detect the start position of the even sector and the start position of the odd sector.

Specifically, if the optical disc, for example, the DVD-R/RW, is inserted, or data to be recorded is inputted, the OPC control section 606 judges to perform the OPC (step 701).

At this time, the wobble and LPP detecting section 604 generates a tracking error signal by combining the electric signals a, b, c, and d of the reflected light quantity outputted from the optical detectors in the optical pickup by a push-pull method, and then detects the wobble clock and the LPP signal from the tracking error signal. The wobble clock and the LPP signal are outputted to an LPP decoder and wobble PLL section 605-1 in the encoding section 605.

The LPP decoder and wobble PLL section 605-1 generates a high frequency clock to be used for the recording by PLL-locking the wobble clock. Then, the LPP decoder and wobble PLL section generates a PLL-locked wobble clock by properly dividing the high frequency clock, and outputs the PLL-locked wobble clock to the OPC control section 606, DVD encoder 605-2, and jitter measuring section 603-3. Also, the LPP decoder and wobble PLL section 605-1 detects a physical address, sync pattern, etc., required for the OPC by decoding the LPP signal with the PLL-locked wobble clock, and outputs the decoded LPP signal to the OPC control section 606.

Meanwhile, the DVD encoder 605-2 encodes the data provided from a PC or the OPC control section 606, and outputs the encoded data to a recording pattern generating section 605-3. The recording pattern generating section 105-3 generates the recording pattern from the encoded data according to the write strategy required for each disc.

Especially, in case of performing the OPC, it is also possible that the DVD encoder 605-2 generates a specific pattern for the OPC (for example, in case of performing the OPC in the unit of an ECC block, random data or nT/nT, and in case of performing the OPC in the unit of a sector, nT/nT), or the recording pattern generating section 605-3 directly generates the recording pattern.

The recording pattern generated by the recording pattern generating section 605-3 is outputted to an LD driving section 608 as an LD drive signal. The LD driving section 608 converts an LD drive voltage into an LD drive current, amplifies the LD drive current, and drives the LD in the optical pickup by the LD drive current. At this time, the recording power of the LD driving section 608 is controlled through the laser power control section 607 controlled by the OPC control section 606.

Accordingly, if it is judged to perform the OPC at step 701, the encoding section 605 generates nT/nT or random data under the control of the OPC control section 606, and outputs nT/nT or random data to the LD driving section 608 through the recording pattern generating section 605-3.

Also, the OPC control section 606 reads the standard power recommended by disc makers from the ATIP information of the lead-in area, divides the recording power into several levels on the basis of the standard power, and sequentially outputs the recording power of the respective level to the laser power control section 607. For example, if the OPC is performed in the unit of an ECC block, the recording power is divided into 16 levels on the basis of the standard recording power, and if the OPC is performed in the unit of a sector, the recording power is divided into 13 levels. The laser power control section 607 outputs the corresponding recording power to the LD driving section 608 under the control of the OPC control section 606 (step 702).

Also, the OPC control section 606 searches the position where the OPC is performed in the unrecorded area of the PCA using the LPP information and wobble clock information provided from the encoding section 605 (step 703). Here, if the OPC is performed in the unit of an ECC block, the position to be searched will be the start position of the ECC block, and if the OPC is performed in the unit of a sector, the position to be searched will be the start position of the corresponding sector in the ECC block. At this time, the search of the position where the OPC is to be performed may be performed from the inner periphery to the outer periphery and vice versa.

Also, if the OPC is performed in the unit of a sector, the start position of the even sector or odd sector where the OPC is to be performed can be searched by the sector synchronization using the wobble clock explained in the first embodiment of the present invention.

If the search for the position where the OPC is to be performed is completed through the above-described processes (step 704), the OPC is performed in the searched position.

For example, if it is assumed that the OPC is performed in the unit of an ECC block, and the recording pattern is the single recording pattern of 3T/3T, the LD driving section 608 records 3T with the 16 recording power levels for one ECC block searched at the above step by changing the recording power for the respective sector (step 705). That is, the LD driving section 608 records pits and blanks of 3T with the same recording power for one sector, and then records pits and blanks of 3T with another recording power in the next sector. This process is repeated for one ECC block.

Meanwhile, if it is assumed that the OPC is performed in the unit of a sector, the recording pattern is 3T/3T, and the recording power is divided into 13 levels, the LD driving section 608 records 3T with the 16 recording power levels for one ECC block searched at the above step by changing the recording power for every two sync frames (step 705). That is, the LD driving section 608 records pits and blanks of 3T with the same recording power for the two sync frames. This process is sequentially performed for the 13 recording power levels for one sector.

Thereafter, if it is judged that the recording is completed (step 706), the LD driving section measures the jitter for each recording power as reproducing one ECC block or one sector where the OPC data is recorded (step 707).

Specifically, the RF signal generating section 601 generates the RF signal by combining (i.e., a+b+c+d) the electric signals a, b, c, and d of the light quantity reflected from the ECC block or sector, and then outputs the RF signal to the RF signal processing section 602. The RF signal processing section 602 AC-couples the RF signal through a capacitor 602-1, and biases the AC-coupled RF signal with a reference voltage through a buffer 602-2 to output the AC-coupled and biased RF signal to the jitter detecting section 603. Thus, the AC component of the RF signal is carried on the basis of the reference voltage Vref.

An equalizer 603-1 of the jitter detecting section 603 equalizes the AC-coupled and biased RF signal to output the equalized RF signal to an automatic gain controller (AGC) 603-2. The AGC 603-2 automatically adjusts the gain of the equalized RF signal to output the gain-adjusted RF signal to the jitter measuring section 603-3. That is, the AC-coupled and biased RF signal is converted into a digital signal through the equalizer 603-1 and the AGC 603-2, and at this time, by using the AGC, the degree of freedom of the slice becomes greater.

The jitter measuring section 603-3 outputs the phase-differentiated portion of the output of the AGC 603-2 to the OPC control section 606 during a jitter window outputted from the encoding section. The OPC control section 606 detects the jitter for one recording power by continuously accumulating the jitter during the jitter window. This process is repeated for the respective recording power. That is, in case of performing the OPC in the unit of an ECC block, the above process is performed 16 times. In case of changing the recording power for every two sync frames as performing the OPC in the unit of a sector, the above process is performed 13 times.

At this time, the basic clock for jitter measurement used in the jitter measuring section 603-3 is on the basis of the PLL-locked wobble clock. The PLL-locked wobble clock is inputted from the encoding section 605. This is for performing the reproduction in the same condition as the recording.

Also, the jitter measuring section 603-3 can detect the jitter in various kinds of methods. For instance, it can detect the jitter by applying the equation 3 as described above. However, the jitter detection is not the subject of the third embodiment of the present invention, and may be performed using the existing techniques.

Figure 19A:
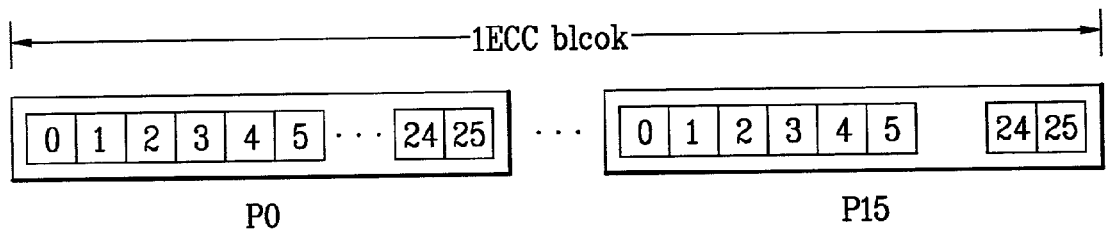
FIG. 19A is a timing diagram illustrating an example of the change of the recording power to 16 levels for one ECC block when the OPC is performed in the unit of an ECC block according to the present invention.

FIG. 19A is a timing diagram illustrating an example of the change of the recording power to 16 levels (P0~P15) for one ECC block when the OPC is performed in the unit of an ECC block according to the present invention. FIG. 19C is a timing diagram illustrating an example of the change of the recording power to 13 levels (P0~P12) for one sector when the OPC is performed in the unit of a sector according to the present invention. Here, the 16 recording power levels or 13 recording power levels are stored on the basis of the standard power recorded during the disc manufacturing.

Especially, in case of performing the OPC in the unit of an ECC block as shown in FIG. 19A, the random data or the single recording pattern of nT/nT is recorded according to the predetermined recording power level in the respective sector. If the random data is recorded as the former, the integrated jitter is measured, and then the optimum recording power is determined according to the determined rule. Meanwhile, if the single recording pattern of nT/nT is recorded as the latter, the single jitter is measured, and then the optimum recording power is determined according to the determined rule.

Figure 19B:
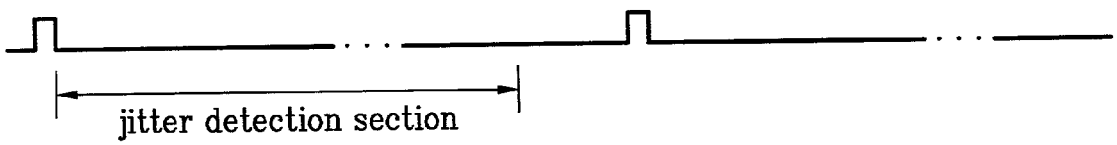
FIG. 19B is a timing diagram illustrating an example of a jitter window generated in FIG. 19A.
Figure 19C:
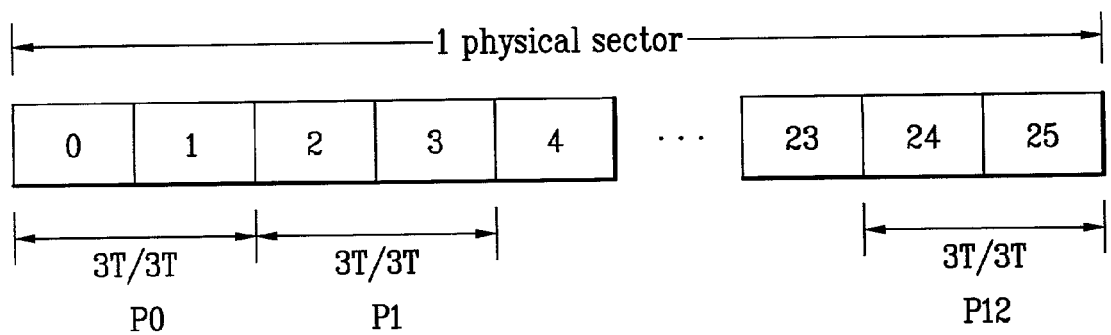
FIG. 19C is a timing diagram illustrating an example of the change of the recording power to 13 levels P0~P12 for one sector when the OPC is performed in the unit of a sector according to the present invention.

Also, in case of performing the OPC in the unit of a sector as shown in FIG. 19B, the single recording pattern of nT/nT is recorded in the sync frame of the corresponding sector according to the respective recording power level, and the case of recording 3T/3T is as an embodiment.

At this time, the jitter window is generated for each sector in case of performing the OPC in the unit of an ECC block, and for each sync frame having the same recording power in case of performing the OPC in the unit of a sector. The jitter window is generated for the stable detection of the jitter. That is, the jitter is detected and then accumulated only within the jitter window. At this time, the jitter window is generated from the PLL-locked wobble clock in the encoding section 605. This jitter window is generated in the encoding section 605 under the control of the OPC control section 606, and is outputted to the jitter measuring section 603-3 of the jitter detecting section 603.

The phase-differentiated portion, i.e., changed amount of length, becomes the jitter amount, and the OPC control section 606 performs the jitter amount accumulating process for the respective recording power during the jitter detection section, i.e., while the jitter window signal is in an active state to store the accumulated jitter amount.

Figure 19D:
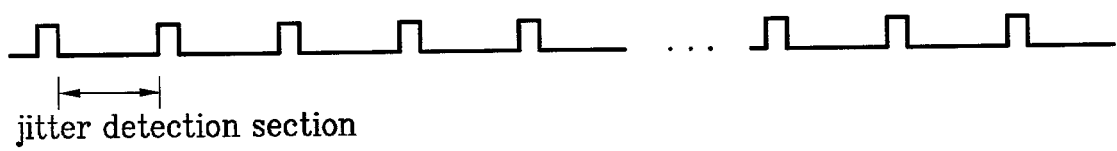
FIG. 19D is a timing diagram illustrating an example of a jitter window generated in FIG. 19C.

In case of performing the OPC in the unit of an ECC block, the jitter window is cleared during one or two wobble clocks of the start sync frame of the first sector of the respective ECC block as shown in FIG. 19B. In case of performing the OPC in the unit of a sector, the jitter window is cleared during one or two wobble clocks for the start sync frame where the recording power is changed as shown in FIG. 19D.

If the jitter is obtained for the respective recording power through the above process, the OPC control section 606 determines the optimum recording power using the jitter value, and stores the optimum recording power (step 708).

Then, the OPC control section records the data in the user data area with the determined optimum recording power (step 709).

Figure 20A:
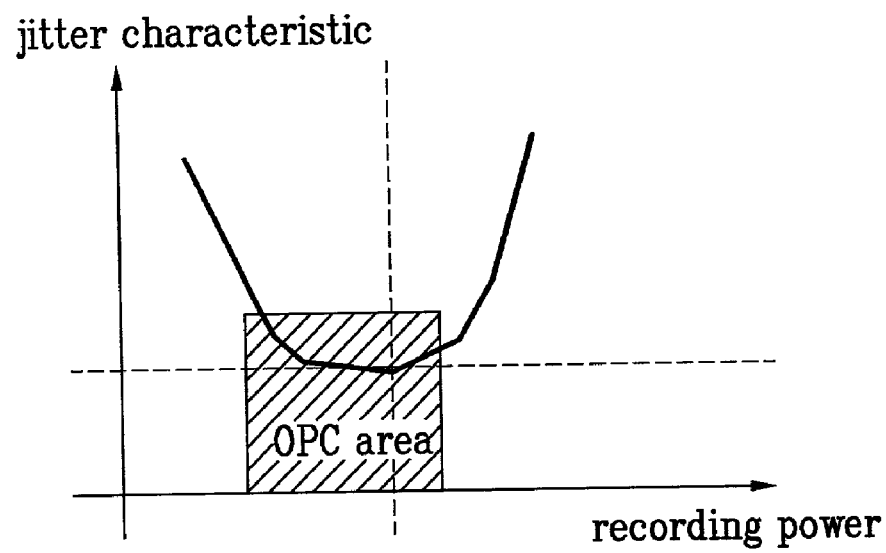
FIGS. 20A and 20B are graphs of the reproduction jitter for the recording power and the optimum recording power determined at that time in case that the OPC is performed in the unit of an ECC block according to the present invention.
Figure 20B:
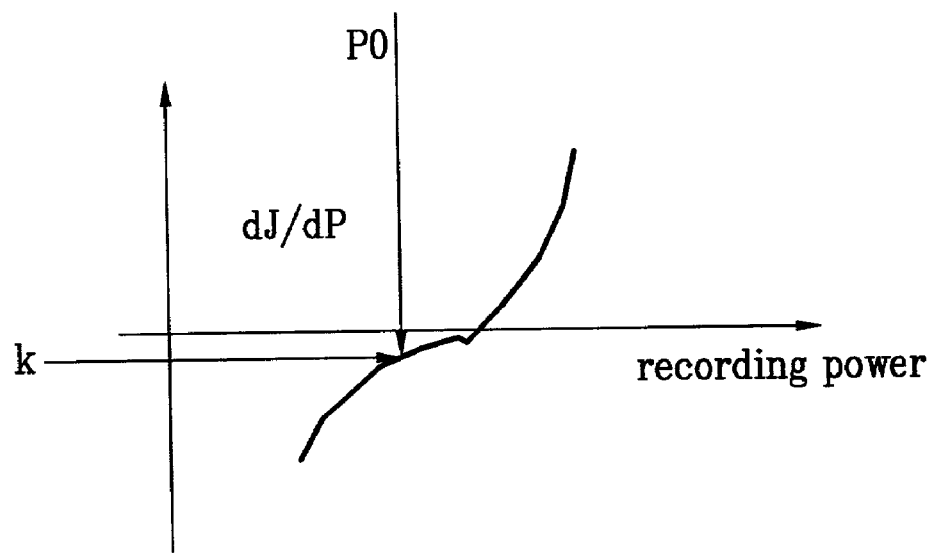

FIGS. 20A and 20B are graphs of the reproduction jitter for the recording power and the optimum recording power determined at that time in case that the OPC is performed in the unit of an ECC block. That is, FIG. 20B shows the graph obtained by differentiating the graph of FIG. 20A.

For example, in case of the recordable disc such as the DVD-R and CD-R, it is not required to secure the repeated recording characteristic, and the recording power whereby the jitter is detected at minimum is determined to be the optimum recording power (Po). At this time, since it is practically difficult to search the recording power whereby the jitter is accurately '0', the recording power that corresponds to the jitter less than that determined in the standard or by the maker is determined to be the optimum recording power. In case that a plurality of recording powers included in the jitter allowable range exist, the recording power having the minimum degree of jitter is determined to be the optimum recording power.

Meanwhile, in case of the rewritable disc such as the DVD-RW and CD-RW, higher recording power corresponds to better jitter characteristic. However, in order to secure the repeated recording characteristic, the recording should be performed with somewhat low recording power. Accordingly, the recording power of the position that satisfies the condition of dJ/dP<K is determined to be the optimum recording power (Po). Here, K value is determined as the experimental value of the drive maker.

As described above, according to the third embodiment of the present invention, the jitter is obtained in the same condition as the data reproduction, and the portion where the slope is radically decreased on the basis of the recording power whereby the jitter becomes minimum or K value is determined to be the optimum recording power. Thus, the degree of jitter can be heightened.

Also, in case of performing the OPC in the unit of an ECC block, a high-output recording is performed in several sync frames (for example, first four sync frames) of the respective physical sector with the recording pattern of 14T/14T. In case of performing the OPC in the unit of a sector, the high-output recording is performed in the first two sync frames of the respective physical sector with the recording pattern of 14T/14T. This enables easy detection of the unused area.

Meanwhile, the present invention can be applied to the DVD-R/RW and all discs that perform the OPC with the LPP structure as well.

As described above, according to the optimum recording power generating method and apparatus according to the present invention, the optimum recording power can be determined even in the DVD-R/RW in which the PCA area exists but no OPC method is prescribed. Especially, by performing the OPC in the unit of a sector, the degree of OPC can be heightened, and the limit of the PCA area can be overcome. That is, since the capacity of the PCA area is limited, the problem in that the OPC cannot be performed even in a state that the remaining recording space exists or further recording is possible and thus the recording cannot be performed any more can be solved.

Also, in case of the asymmetric method, the degree of OPC can be heightened by limiting the recording pattern to the longest T and the shortest T and by simultaneously performing the OPC with respect to the longest T and the shortest T.

Also, the recording power is determined according to the power calibration, i.e., from the outer or inner periphery of the PCA area, and thus the seeking for the next power test area among the PCA is facilitated.

Also, in case of performing the OPC in the unit of a sector in the DVD-R/RW, the start position of the respective physical sector is searched through the synchronizing method by the wobble, and thus the start position can be easily and accurately searched even in the odd sector. This enables the OPC to be performed accurately in the start position of all the sectors.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of generating an optimum recording power for an optical recording medium in which land and groove signal tracks composed of a plurality of sectors are provided, data can be recorded in one of the signal tracks, and position information on the signal track where the data can be recorded is pre-pitted by a high frequency signal and recorded in the other signal track, and control information is wobbled in the signal tracks, the method comprising the steps of:

synchronizing the sectors of a test area on the optical recording medium to perform an optimum power calibration (OPC), wherein the synchronizing step comprises detecting the signal wobbled on the signal track, PLL-locking the wobble signal, and outputting the PLL-locked wobble signal, and detecting a start position of the respective sector by counting the PLL-locked wobble signal;

generating a recording pattern for performing the OPC;

recording the recording pattern in a specified sector of the synchronized unrecorded test area as changing a recording power on the basis of a reference recording power recorded on the optical recording medium;

reproducing the data recorded in the specified sector with the respective changed recording power, and determining the optimum recording power from the characteristic of a reproduced signal; and recording user data in a predetermined user data area of the optical recording medium with the determined optimum recording power.

2. The method as claimed in claim 1, wherein the counting step resets and starts the counting operation in the start position of a first sector of an ECC block that is a data recording/reproducing unit.

3. The method as claimed in claim 1, wherein the recording pattern recorded at the recording step is recorded in synchronization with the PLL-locked wobble signal.

4. The method as claimed in claim 1, wherein the recording power at the recording step is changed into N (N is a natural number) levels for one sector.

5. The method as claimed in claim 4, wherein N is 13.

6. The method as claimed in claim 4, wherein at the recording step, in the specified sector where the OPC is performed is recorded the recording pattern generated at the recording step as the recording power is changed for every two synch frames.

7. A method of generating an optimum recording power for an optical recording medium in which signal tracks composed of a plurality of sectors are provided, and position information on the signal track where data can be recorded and control information are provided by preformatted form, the method comprising the steps of:

synchronizing first data unit of a test area on the optical recording medium to perform an optimum power calibration (OPC);

generating a recording pattern for performing the OPC, wherein a longest time period (T) (corresponding to a length for one clock pulse) and a shortest T are generated as the recording pattern;

recording the recording pattern in a specified first data unit as changing a recording power on the basis of a reference recording power recorded on the optical recording medium, wherein the longest T and the shortest T are recorded with the same recording power for at least two parts in the corresponding first data unit;

reproducing the data recorded in the specified first data unit with the respective changed recording power, and determining the optimum recording power from the characteristic of a reproduced signal; and recording user data in a predetermined user data area of the optical recording medium with the determined optimum power.

8. The method as claimed in claim 7, wherein the optimum recording power determining step comprises the steps of:

generating a radio frequency (RF) signal using electric signals corresponding to a light quantity reflected from the first data unit where the OPC is performed;

AC-coupling the RF signal, and biasing the AC-coupled RF signal with a reference voltage;

detecting a peak envelope and a bottom envelop of the AC-coupled and biased RF signal;

detecting an asymmetric characteristic of the longest T and the shortest T for the respective recording power from the peak envelop and the bottom envelop; and determining the recording power having a minimum degree of asymmetry in condition that the asymmetric characteristic is within an allowable range as the optimum recording power.

9. A method of generating an optimum recording power for an optical recording medium in which signal tracks are provided, and position information on the signal track where the data can be recorded is provided by a pre-formatted form, the method comprising the steps of:

generating a recording pattern for performing the OPC, wherein a longest time period (T) is generated as the recording pattern;

recording the recording pattern in a first data unit of the test area as changing a recording power on the basis of a reference recording power recorded on the optical recording medium, wherein the longest T is recorded with the same recording power for at least two parts of the first data unit;

reproducing the data recorded in the first data unit with the respective chanaed recording power, and determining the optimum recording power from the characteristic of a reproduced signal; and recording user data in a predetermined user data area of the optical recording medium with the determined optimum recording power.

10. The method as claimed in claim 9, wherein the optimum recording power determining step comprises the steps of:

generating a radio frequency (RF) signal using electric signals corresponding to a light quantity reflected from the first data unit where the OPC is performed;

detecting a peak envelope and a bottom envelop of the RF signal;

detecting a modulation amplitude of the longest T for the respective recording power from the peak envelop and the bottom envelop;

generating a gamma curve by obtaining a change rate of the modulation amplitude and a change rate of the recording power; and selecting the recording power corresponding to a predetermined gamma target in the gamma curve, and determining the optimum recording power by multiplying the selected recording power by a predetermined multiplication factor.

11. A method of generating an optimum recording power for an optical recording medium in which signal tracks are provided, and position information on the signal track where the data can be recorded is provided by a pre-formatted form, the method comprising the steps of:

generating a recording pattern for performing the OPC, wherein a long T having a saturation characteristic and a short T having no saturation characteristic are generated as the recording pattern;

recording the recording pattern in the test area as changing a recording power on the basis of a reference recording power recorded on the optical recording medium, wherein the recording can be performed by a first data unit, and the long T and the short T are recorded with the same recording power for at least two parts of the first data unit;

reproducing the data recorded in the test area with the respective changed recording power, and determining the optimum recording power from the characteristic of a reproduced signal; and recording user data in a predetermined user data area of the optical recording medium with the determined optimum recording power.

12. The method as claimed in claim 11, wherein the long T is 14T, and the short T is 3T.

13. The method as claimed in claim 11, wherein the optimum recording power determining step comprises the steps of:

generating an RF signal using electric signals corresponding to a light quantity reflected from the first data unit where the OPC is performed;

detecting a peak envelope and a bottom envelop of the RF signal;

detecting a center voltage of the long T and a center voltage of the short T for the respective recording power from the peak envelop and the bottom envelop; and determining the recording power obtained when the coincidence degree of the center voltage of the long T and the center voltage of the short T detected in a saturation area of the long T is within an allowable range as the optimum recording power.

14. A method of generating an optimum recording power for an optical recording medium in which signal tracks are provided, and position information on the signal track where the data can be recorded is provided by a pre-formatted form, the method comprising the steps of:

generating a recording pattern data for performing the OPC, wherein a single recording pattern of nT is generated as the recording pattern data;

recording the recording pattern data in a first data unit of the test area as changing a recording power on the basis of a reference recording power recorded on the optical recording medium, wherein the nT is recorded with the same recording power for at least two parts of the first data unit;

reproducing the data recorded in the first data unit with the respective changed recording power, and determining the optimum recording power from the characteristic of a reproduced signal; and recording user data in a predetermined user data area of the optical recording medium with the determined optimum recording power.

15. The method as claimed in claim 14, wherein the optimum recording power determining step comprises the steps of:

generating an RF signal using electric signals corresponding to a light quantity reflected from the first data unit where the OPC is performed;

AC-coupling the RF signal, and biasing the AC-coupled RF signal with a reference voltage;

detecting a jitter characteristic of the AC-coupled and biased RF signal for the respective recording power; and determining the recording power in a jitter allowable range as the optimum recording power.

16. The method as claimed in claim 15, wherein the optimum recording power determining step determines the recording power whereby a jitter is the minimum as the optimum recording power if the optical recording medium is a recordable optical recording medium.

17. The method as claimed in claim 15, wherein the optimum recording power determining step determines the recording power corresponding to a higher jitter within a jitter allowable range as the optimum recording power if the optical recording medium is a rewritable optical recording medium.

18. The method as claimed in claim 15, wherein the optimum recording power determining step determines the recording power of a position where a differentiated value (dJ/dP) of a jitter characteristic for each recording power is smaller than a certain experimental value (K) as the optimum recording power if the optical recording medium is a rewritable optical recording medium.

19. A method of generating an optimum recording power for an optical recording medium, the method comprising the steps of:

searching a test area on the optical recording medium to perform an optimum power calibration (OPC);

generating a recording pattern data for performing the OPC;

recording the recording pattern data in a first unit of the test area as changing a recording power on the basis of a reference recording power recorded on the optical recording medium, wherein the recording can be performed in a part of the first unit;

reproducing the data recorded in the first unit with the respective changed recording power, and determining the optimum recording cower from the characteristic of a reproduced signal; and recording user data in a predetermined user data area of the optical recording medium with the determined optimum recording power;

wherein the OPC is performed in a direction from an inner periphery to an outer periphery of the test area, and the recording at this time is performed from a low power to a high power.

20. A method of generating an optimum recording power for an optical recording medium, the method comprising the steps of:

searching a test area on the optical recording medium to perform an optimum power calibration (OPC);

generating a recording pattern data for performing the OPC; recording the recording pattern data in a first unit of the test area as changing a recording power on the basis of a reference recording power recorded on the optical recording medium, wherein the recording can be performed in a part of the first unit;

reproducing the data recorded in the first unit with the respective changed recording power, and determining the optimum recording power from the characteristic of a reproduced signal; and recording user data in a predetermined user data area of the optical recording medium with the determined optimum recording power;

wherein the OPC is performed in a direction from an outer periphery to an inner periphery of the test area, and the recording at this time is performed from a high power to a low power.

21. An apparatus for generating an optimum recording power for an optical recording medium in which land and groove signal tracks composed of a plurality of sectors are provided, data can be recorded in one of the signal tracks, and position information on the signal track where the data can be recorded is pre-pitted by a high frequency signal and recorded in the other signal track, and control information is wobbled in the signal tracks, the apparatus comprising:

a control section for detecting a start position of the respective sector of a test area by counting a PLL-locked wobble signal, and controlling generation of a recording pattern and a recording power for performing an optimum power calibration (OPC);

an encoding section for detecting and PLL-locking the wobble signal formed on the track using an electric signal of a reflected light quantity outputted from the optical recording medium, detecting and decoding a pre-pit signal, and generating the recording pattern for performing the OPC;

a laser power control section for dividing the recording power into several levels on the basis of a reference recording power recorded on the optical recording medium under the control of the control section and outputting the recording power levels;

a recording section for sequentially recording the recording pattern in a specified sector of the unrecorded test area with the several recording power levels changed by and outputted from the laser power control section; and an optimum recording power determining section for reproducing the data recorded in the specified sector for the respective recording power level, and determining an optimum recording power from the characteristic of a reproduced signal.

22. The apparatus as claimed in claim 21, wherein the control section searches the sector of the unrecorded test area where the OPC is to be performed, and controls the recording of the recording pattern generated by the encoding section as changing the recording power for every N (N is a natural number) sync frames in the searched specified sector.

23. The apparatus as claimed in claim 21, wherein in case that the encoding section generates a longest time period (T) (corresponding to a length for one clock pulse) and a shortest T as the recording pattern, and the recording section records the longest T and the shortest T with the same recording power for every N sync frames in the corresponding sector, the optimum recording power determining section comprises:
- a radio frequency (RF) signal generating section for generating an RF signal using the electric signals corresponding to the light quantity reflected from the sector where the OPC is performed;
- an RF signal processing section for AC-coupling the RF signal, and biasing the AC-coupled RF signal with a reference voltage;
- an RF envelop detecting section for detecting a peak envelope and a bottom envelop of the AC-coupled and biased RF signal; and
- a determining section for detecting an asymmetric characteristic of the longest T and the shortest T for the respective recording power from the peak envelop and the bottom envelop of the RF signal, and determining the recording power having a minimum degree of asymmetry in condition that the asymmetric characteristic is within an allowable range as the optimum recording power.

24. The apparatus as claimed in claim 21, wherein in case that the encoding section generates a longest T as the recording pattern, and the recording section records the longest T with the same recording power for every N sync frames in the corresponding sector, the optimum recording power determining section comprises:
- an RF signal generating section for generating an RF signal using the electric signals corresponding to the light quantity reflected from the sector where the OPC is performed;
- an RF envelop detecting section for detecting a peak envelope and a bottom envelop of the RF signal; and
- a determining section for detecting a modulation amplitude of the longest T for the respective recording power from the peak envelop and the bottom envelop of the RF signal, generating a gamma curve by obtaining a change rate of the modulation amplitude and a change rate of the recording power, selecting the recording power corresponding to a predetermined gamma target in the gamma curve, and determining the optimum recording power by multiplying the selected recording power by a predetermined multiplication factor.

25. The apparatus as claimed in claim 21, wherein in case that the encoding section generates a long T having a saturation characteristic and a short T having no saturation characteristic as the recording pattern, and the recording section records the long T and the short T with the same recording power for every N sync frames in the corresponding sector, the optimum recording power determining section comprises:
- an RF signal generating section for generating an RF signal using the electric signals corresponding to the light quantity reflected from the sector where the OPC is performed;
- an RF envelop detecting section for detecting a peak envelope and a bottom envelop of the RF signal; and
- a determining section for detecting a center voltage of the long T and a center voltage of the short T for the respective recording power from the peak envelop and the bottom envelop of the RF signal, determining the recording power obtained when the coincidence degree of the center voltage of the long T and the center voltage of the short detected in a saturation area of the long T is within an allowable range as the optimum recording power.

26. The apparatus as claimed in claim 21, wherein in case that the encoding section generates a single recording pattern of nT, and the recording section records the nT with the same recording power for every N sync frames in the corresponding sector, the optimum recording power determining section comprises:
- an RF signal generating section for generating an RF signal using the electric signals corresponding to the light quantity reflected from the sector where the OPC is performed;
- an RF signal processing section for AC-coupling the RF signal, and biasing the AC-coupled RF signal with a reference voltage;
- a jitter detecting section for detecting a jitter characteristic of the AC-coupled and biased RF signal for the respective recording power; and
- a determining section for determining the recording power in a jitter allowable range as the optimum recording power.

* * * * *